US011964487B2

(12) United States Patent
Arakawa

(10) Patent No.: US 11,964,487 B2
(45) Date of Patent: Apr. 23, 2024

(54) IMAGE RECORDING APPARATUS INCLUDING FIRST AND SECOND GUIDE PORTIONS FOR MOVING CAP UNIT TOWARD HEAD TO COVER NOZZLE SURFACE

(71) Applicant: BROTHER KOGYO KABUSHIKI KAISHA, Nagoya (JP)

(72) Inventor: Yuta Arakawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 41 days.

(21) Appl. No.: 17/666,091

(22) Filed: Feb. 7, 2022

(65) Prior Publication Data

US 2022/0305790 A1 Sep. 29, 2022

(30) Foreign Application Priority Data

Mar. 26, 2021 (JP) ................................ 2021-053122

(51) Int. Cl.
*B41J 2/165* (2006.01)

(52) U.S. Cl.
CPC .. *B41J 2/16511* (2013.01); *B41J 2002/16514* (2013.01)

(58) Field of Classification Search
CPC .......... B41J 2/16511; B41J 2002/16514; B41J 2002/16576; B41J 2/16508
See application file for complete search history.

(56) References Cited

U.S. PATENT DOCUMENTS

| | | | | |
|---|---|---|---|---|
| 8,651,617 | B2 * | 2/2014 | Arakane | B41J 29/38 347/29 |
| 9,849,680 | B2 * | 12/2017 | Ogawa | B41J 2/16511 |
| 10,029,468 | B2 * | 7/2018 | Tamaki | B41J 2/16508 |
| 10,493,761 | B2 * | 12/2019 | Morimoto | B41J 2/16511 |
| 2007/0046721 | A1 | 3/2007 | Miyazawa | |
| 2013/0050333 | A1 | 2/2013 | Tanaka et al. | |
| 2018/0264811 | A1 | 9/2018 | Hasegawa | |

FOREIGN PATENT DOCUMENTS

| | | |
|---|---|---|
| JP | 2018-154029 A | 10/2018 |

OTHER PUBLICATIONS

Extended European Search Report issued in corresponding European Patent Application No. 22155225.0, dated Jul. 1, 2022.

* cited by examiner

*Primary Examiner* — Sharon Polk
(74) *Attorney, Agent, or Firm* — Merchant & Gould P.C.

(57) ABSTRACT

An image recording apparatus includes: a carriage movable in a first direction; a head mounted on the carriage; a holder movable in the first direction; a cap unit mounted on the holder; and first and second guide portions. The cap unit is movable relative to the holder in the first direction and is also movable toward and away from the head in a second direction crossing the first direction. The head is configured to abut on a second abutment portion of the cap unit in accordance with movement of the carriage in the first direction toward a first abutment portion of the holder. The first guide portion is configured to guide the holder in the first direction. The second guide portion is configured to guide the holder in the second direction to move the cap unit toward the head in accordance with movement of the holder in the first direction.

15 Claims, 13 Drawing Sheets

IMAGE RECORDING APPARATUS INCLUDING FIRST AND SECOND GUIDE PORTIONS FOR MOVING CAP UNIT TOWARD HEAD TO COVER NOZZLE SURFACE

CROSS REFERENCE TO RELATED APPLICATIONS

This application claims priority from Japanese Patent Application No. 2021-053122 filed Mar. 26, 2021. The entire content of the priority application is incorporated herein by reference.

BACKGROUND

There has been known an image recording apparatus such as an ink-jet printer configured to eject ink from a head mounted on a carriage while moving the carriage. The conventional image recording apparatus includes a cap configured to cover a nozzle surface of the head in order to prevent the nozzle surface from getting dry. The cap is movable toward and away from the nozzle surface. The cap is guided to approach the nozzle surface while moving along with the carriage with the cap in abutment with the carriage.

SUMMARY

In an attempt to fix a position of the cap relative to the head with high accuracy, an abutment portion configured to come into contact with the carriage may be provided on a cap unit in the conventional configuration described above. However, such provision of the abutment portion can fix the position of the cap unit relative to the carriage, but cannot directly fix the position of the cap unit relative to the head. On the other hand, if the abutment portion is in contact with the head and the cap unit is guided to approach the head while the relative position between the head and the cap unit is fixed by the contact between the abutment portion and the head, a large load may be imparted on the head due to the contact thereof with the abutment portion, disadvantageously.

In view of the foregoing, it is an object of the disclosure to provide a technology to provide positional fixing of the cap unit relative to the head.

In order to attain the above and other object, according to one aspect, the present disclosure provides an image recording apparatus including a carriage, a head, a holder, a cap unit, a first guide portion, and a second guide portion. The carriage is movable in a first direction. The head is mounted on the carriage and has a nozzle surface formed with nozzles to eject liquid through the nozzles. The holder is movable in the first direction and includes a first abutment portion. The carriage is movable in the first direction toward the first abutment portion to abut on the first abutment portion. The cap unit is mounted on the holder and is movable relative to the holder in the first direction. The cap unit includes a cap configured to cover the nozzle surface. The cap unit is also movable toward and away from the head in a second direction crossing the first direction to cover and uncover the nozzle surface. The cap unit includes a second abutment portion on which the head is configured to abut in accordance with movement of the carriage in the first direction toward the first abutment portion. The first guide portion is configured to guide the holder in the first direction toward the first abutment member. The second guide portion is configured to guide the holder or the cap unit in the second direction to move the cap unit toward the head in accordance with movement of the holder in the first direction.

Upon abutment of the carriage moving in the first direction on the first abutment portion, the holder starts to move in the first direction together with the carriage moving in the first direction. In accordance with the movement of the holder in the first direction, the second guide portion guides the holder or the cap unit to move the cap unit toward the head in the second direction, thereby causing the second abutment portion to abut on the head which moves in the first direction along with the holder. The cap unit is thus fixed in position relative to the head. As the carriage moves further in the first direction, the cap of the cap unit covers the nozzle surface of the head.

According to another aspect, the disclosure also provides an image recording apparatus including a carriage, a head, a holder, a cap unit, and a guide member. The carriage is movable in a first direction. The head is mounted on the carriage and has a nozzle surface formed with nozzles to eject liquid through the nozzles. The holder is movable in the first direction and includes a first abutment portion. The carriage is movable in the first direction toward the first abutment portion to abut on the first abutment portion. The cap unit is mounted on the holder and is movable relative to the holder in the first direction. The cap unit includes a cap configured to cover the nozzle surface. The cap unit is also movable toward and away from the head in a second direction crossing the first direction to cover and uncover the nozzle surface. The cap unit includes a second abutment portion on which the head is configured to abut in accordance with movement of the carriage in the first direction toward the first abutment portion. The guide member includes a first guide portion and a second guide portion. The first guide portion is configured to guide the holder in the first direction toward the first abutment member. The second guide portion is configured to guide the holder in the second direction to move the cap unit toward the head in the second direction in accordance with movement of the holder in the first direction.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
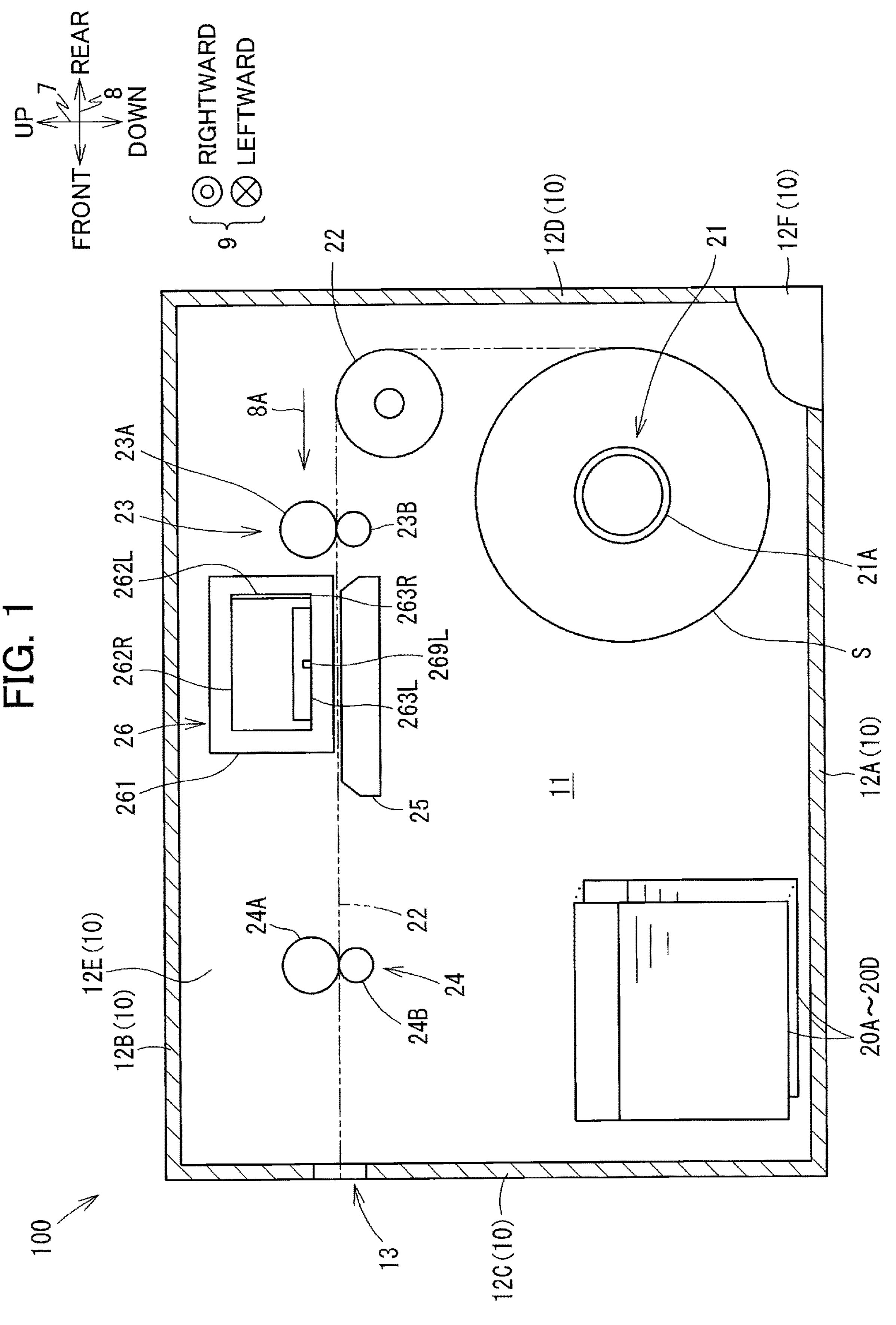
FIG. 1 is a schematic view illustrating an internal structure of a printer 100 according to one embodiment.

Hereinafter, a printer 100 according to one embodiment of the present disclosure will be described with reference to FIGS. 1 through 13B. Configurations of the printer 100 illustrated in the drawings are merely exemplary and do not intend to limit the present disclosure.

In the following description, the expressions like "front", "rear", "above", "below", "horizontally" and the like will be used assuming that the printer 100 is disposed in an orientation in which it is intended to be used (the orientation illustrated in FIG. 1). That is, in FIG. 1, the side of the printer 100 where a discharge opening 13 is formed is defined as a front side of the printer 100. The left and right sides of the printer 100 will be defined based on the assumption that the printer 100 is viewed from its front side.

Further, wherever appropriate, an upward direction and a downward direction will be collectively referred to as "up-down direction 7". Likewise, a frontward direction and a rearward direction will be referred to as "front-rear direction 8," and a leftward direction and a rightward direction will be collectively referred to as "left-right direction 9" wherever appropriate. The term assembly is abbreviated as "ASSY" herein.

<Overall Structure of Printer 100>

Referring to FIG. 1, the printer 100 is of an ink-jet recording device configured to record an image on a sheet S as an image recording medium. In the present embodiment, the sheet S is a rolled elongated sheet constituting a sheet roll. The sheet roll of sheet S defines a through-hole at a center thereof for enabling the rolled sheet S to be mounted in the printer 100. The sheet S may be a rolled label sheet. In the rolled label sheet, a plurality of label sheets on each of which an image is to be printed is affixed to an elongated base sheet at regular intervals. Instead of the rolled sheet S, a fan-fold stack of paper, a cut sheet, and a sheet-like fabric are also available as the image recording medium.

Housing 10

In FIG. 1, the printer 100 includes a housing 10 having a generally rectangular parallelepiped shape. The housing 10 has a size suitable for setting on a desk, a floor, and a rack, for example. The housing 10 has a bottom wall 12A, a top wall 12B, a front wall 12C, a rear wall 12D, a left wall 12E, and a right wall 12F constituting an outer shell of the housing 10. The housing 10 defines an internal space 11 therein. Incidentally, in FIG. 1, only a portion of the right wall 12F is delineated.

The front wall 12C has an upper portion where the discharge opening 13 is formed. The discharge opening 13 has a slit-like shape elongated in the left-right direction 9. The discharge opening 13 allows the sheet S on which an image is formed to be discharged therethrough out of the housing 10. A take-up device (not illustrated) is provided in the printer 100 to take up the sheet S discharged through the discharge opening 13.

Internal Structure Inside Housing 10

Figure 2A:
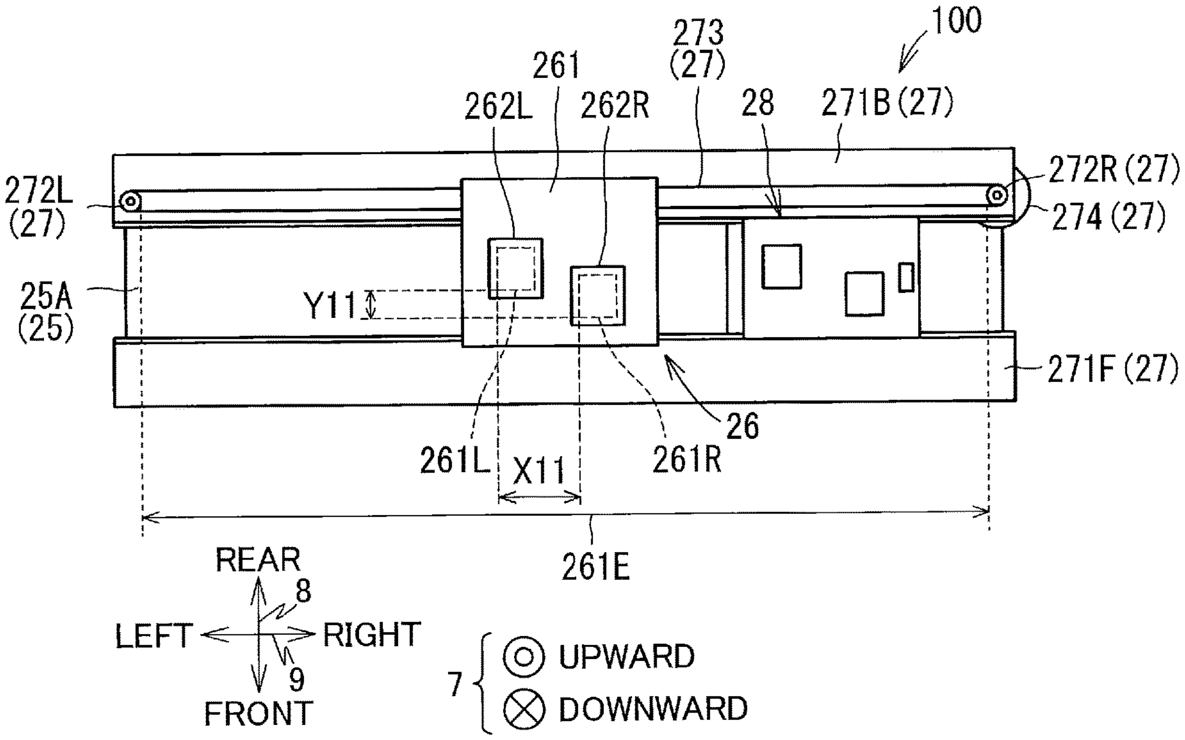
FIG. 2A is a schematic view illustrating a carriage conveying mechanism 27 provided in the printer 100.
Figure 2B:
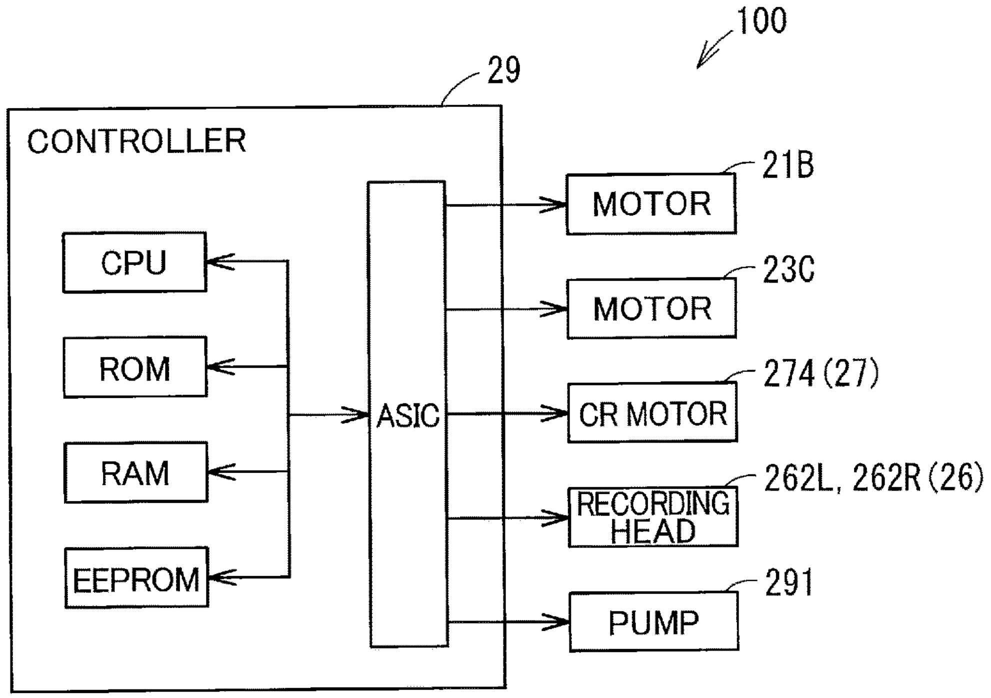
FIG. 2B is a block diagram illustrating electrical connections in the printer 100.

In the internal space 11 of the housing 10, the printer 100 includes four tanks 20A, 20B, 20C, 20D, a holder 21, a tensioner 22, a pair of conveyer rollers 23, a pair of discharge rollers 24, a platen 25, and a recording unit 26. The printer 100 further includes a carriage conveying mechanism 27, and a capping mechanism 28, as illustrated in FIG. 2A. Further, the printer 100 includes motors 21B, 23C, a pump 291, and a controller 29, as illustrated in FIG. 2B.

Each of the tanks 20A through 20D is positioned close to the bottom wall 12A and the front wall 12C, as illustrated in FIG. 1. The tanks 20A-20D store therein ink of respective colors of yellow, magenta, cyan, and black. Each ink is so called latex ink containing pigment, resin particulates, and additive agent. Each ink has a suitable viscosity to allow the pigment and the resin particulates to e uniformly dispersed therein. The pigment is a source of the color of the ink. The resin particulates enable the pigment to be adhered to the sheet S, and are made from, for example, synthetic resin configured to exceed a glass transition temperature when heated by a heater (not illustrated). In the following description, the colors of yellow, magenta, cyan, and black will be referred to simply as "Y", "M", "C", and "K", respectively.

Incidentally, instead of the tanks 20A-20D, only a single tank may be provided. The tank may store liquid other than ink such as, for example, pretreatment liquid. The pretreatment liquid may contain cationic polymer, multivalent metal salt (for example, magnesium salt), and the like. The pretreatment liquid functions to aggregate or precipitate component(s) contained in the ink to prevent blurring of the ink or strike-through of the ink to the backside of the sheet. The pretreatment liquid may function to improve chromogenic nature and quick drying nature of the ink.

The holder 21 is positioned close to the bottom wall 12A and the rear wall 12D, as illustrated in FIG. 1. The holder 21 includes a rotation shaft 21A supporting the roll of sheet S (sheet roll S). The rotation shaft 21A extends in the left-right direction 9 from a side frame (not illustrated) extending in the up-down direction 7 and the front-rear direction 8 at the internal space 11.

The rotation shaft 21A of the holder 21 is drivingly connected to the motor 21B (FIG. 2B) so that driving force of the motor 21B is transmitted to the rotation shaft 21A. Hence, the holder 21 is rotatable about an axis of the rotation shaft 21A in a counterclockwise direction in FIG. 1. In accordance with the rotation of the holder 21, the sheet roll S supported by the holder 21 is caused to rotate. The sheet S is pulled upward from a rear end of the sheet roll S toward the tensioner 22 by rotations of the pair of conveyer rollers 23 and the pair of discharge rollers 24.

In the internal space 11, a pair of side frames (not illustrated) is provided at a position above the holder 21. The tensioner 22, the pair of conveyer rollers 23, and the pair of discharge rollers 24 are respectively rotatably supported by this pair of side frames. Each of the tensioner 22, the pair of conveyer rollers 23, and the pair of discharge rollers 24 extends in the left-right direction 9 so as to be rotatable about a rotational axis extending in the left-right direction 9.

The tensioner 22 is urged rearward by an urging member (not illustrated) such as a spring. The tensioner 22 contacts the sheet S paid out from the sheet roll S and is configured to guide the sheet S frontward such that the sheet S is curved along a peripheral surface of the tensioner 22.

The pair of conveyer rollers 23 includes a drive roller 23A and a pinch roller 23B. The drive roller 23A is positioned frontward of the tensioner 22. The drive roller 23A has a lower end approximately in alignment with an upper end of the tensioner 22 in the up-down direction 7. The pinch roller 23B contacts the drive roller 23A from below.

The pair of discharge rollers 24 includes a drive roller 24A and a pinch roller 24B. The drive roller 24A is positioned frontward of the drive roller 23A. The drive roller 24A has a lower end approximately in alignment with the upper end of the tensioner 22 in the up-down direction 7. The pinch roller 24B contacts the drive roller 24A from below.

The drive roller 23A and the drive roller 24A are rotatable by a driving force from the motor 23C (see FIG. 2B). While being nipped between the drive roller 23A and the pinch roller 23B and between the drive roller 24A and the pinch roller 24B, the sheet S is conveyed frontward in a conveying direction 8A.

The platen 25 and the recording unit 26 are each attached to the housing 10 at a position between the pair of conveyer rollers 23 and the pair of discharge rollers 24 in the front-rear direction 8 (in the conveying direction 8A).

The platen 25 extends in the left-right direction 9 between the pair of side frames supporting the conveyer rollers 23. The platen 25 has a support surface 25A (FIG. 2A) configured to support the sheet S. The support surface 25A is an upper end surface of the platen 25 and extends in the front-rear direction 8 and the left-right direction 9. The support surface 25A is so positioned that the support surface 25A is approximately in alignment with the upper end of the tensioner 22 with respect to the up-down direction 7. The platen 25 may be a suction type platen configured to attract the sheet S to the support surface 25A by suction.

<Details of Recording Unit 26>

As illustrated in FIGS. 1 and 2A, the recording unit 26 includes a carriage 261 and two recording heads 262L, 262R. The carriage 261 is positioned immediately above the support surface 25A in the up-down direction 7 with a marginal gap therefrom. The carriage 261 is reciprocally movable with respect to the left-right direction 9 by a driving force of the carriage conveying mechanism 27 (see FIG. 2A). The recording heads 262L, 262R have lower surfaces 263L, 263R (see FIGS. 1 and 3), respectively.

Figure 4:
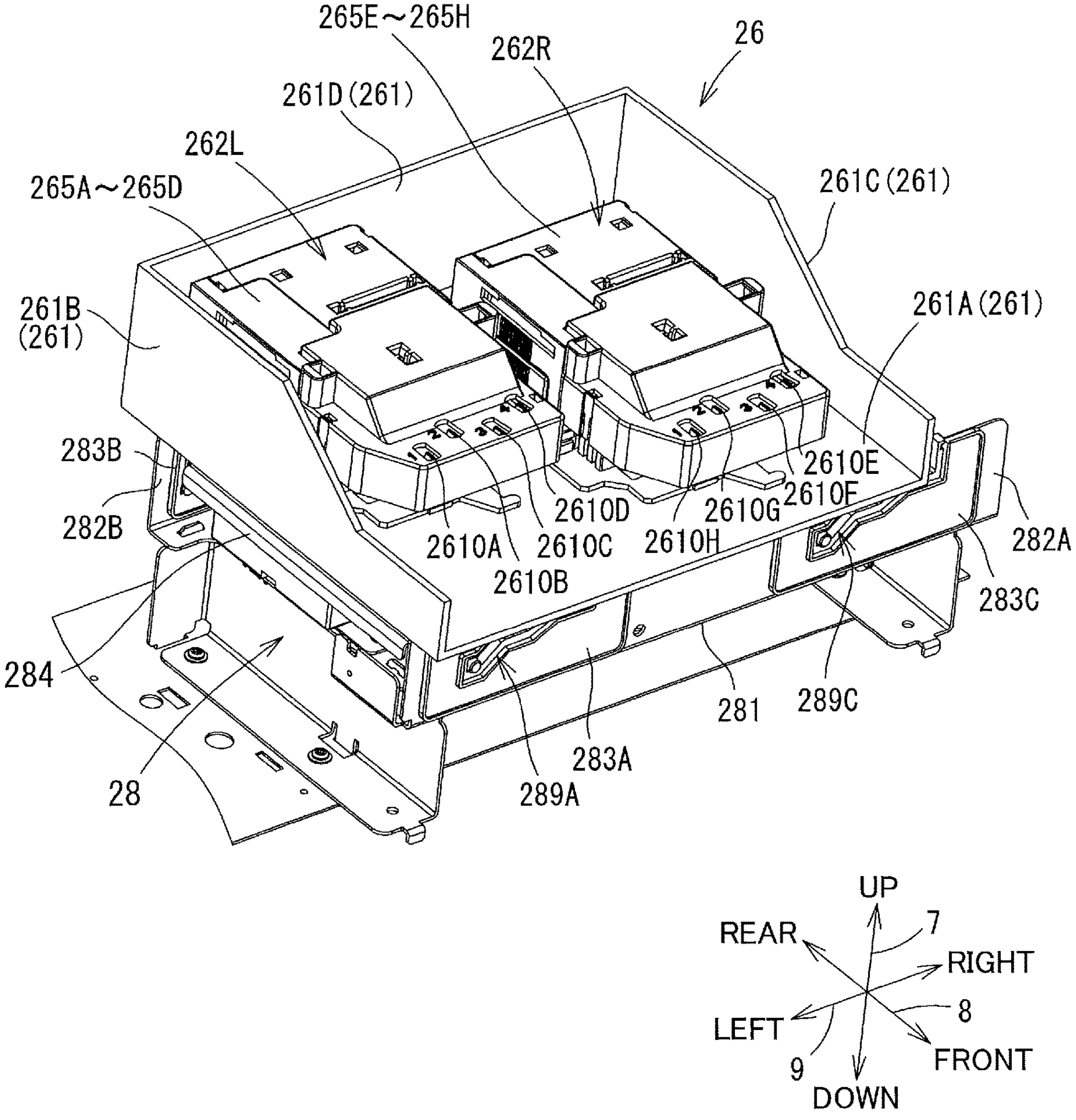
FIG. 4 is a perspective view of a recording unit 26 and a capping mechanism 28 those provided in the printer 100.

As illustrated in FIG. 4, the carriage 261 has a tray-like shape that is open upward and frontward. The carriage 261 includes a base wall 261A, a left side wall 261B, a right side wall 261C, and a rear side wall 261D. The base wall 261A has a rectangular shape in a plan view. The left side wall 261B extends upward from a left end of the base wall 261A. The right side wall 261C extends upward from a right end of the base wall 261A. The rear side wall 261D extends upward from a rear end of the base wall 261A.

The base wall 261A is formed with two through-holes 261L, 261R (hereinafter may also be referred to as "HD through-holes 261L, 261R) for the respective recording heads 262L, 262R, as illustrated in FIG. 2A. Each of the HD through-holes 261L, 261R extends in the up-down direction 7 throughout a thickness of the base wall 261A. The HD through-holes 261L, 261R have the same shape as each other. The shape of the HD through-holes 261L, 261R generally conforms with a shape of the respective lower surfaces 263L, 263R of the recording heads 262L, 262R. Incidentally, in FIG. 2A, each of the HD through-holes 261L, 261R is schematically illustrated as a rectangle in a broken line.

The HD through-hole 261R is separated rightward from the HD through-hole 261L by a distance X11 in the left-right direction 9. That is, the HD through-hole 261R is positioned rightward of the HD through-hole 261L, and a distance between a left edge of the HD through-hole 261R and a left edge of the HD through-hole 261L is the distance X11. Further, the HD through-hole 261L occupies a region partially overlapped with a region the HD through-hole 261R occupies with respect to the front-rear direction 8. Specifically, a front edge of the HD through-hole 261R is positioned frontward of (spaced apart from) a front edge of the HD through-hole 261L by a distance Y11, and a rear edge of the HD through-hole 261R is positioned frontward of (spaced apart from) a rear edge of the HD through-hole 261L by the distance Y11. The distances X11 and Y11 are suitably determined.

Figure 3A:
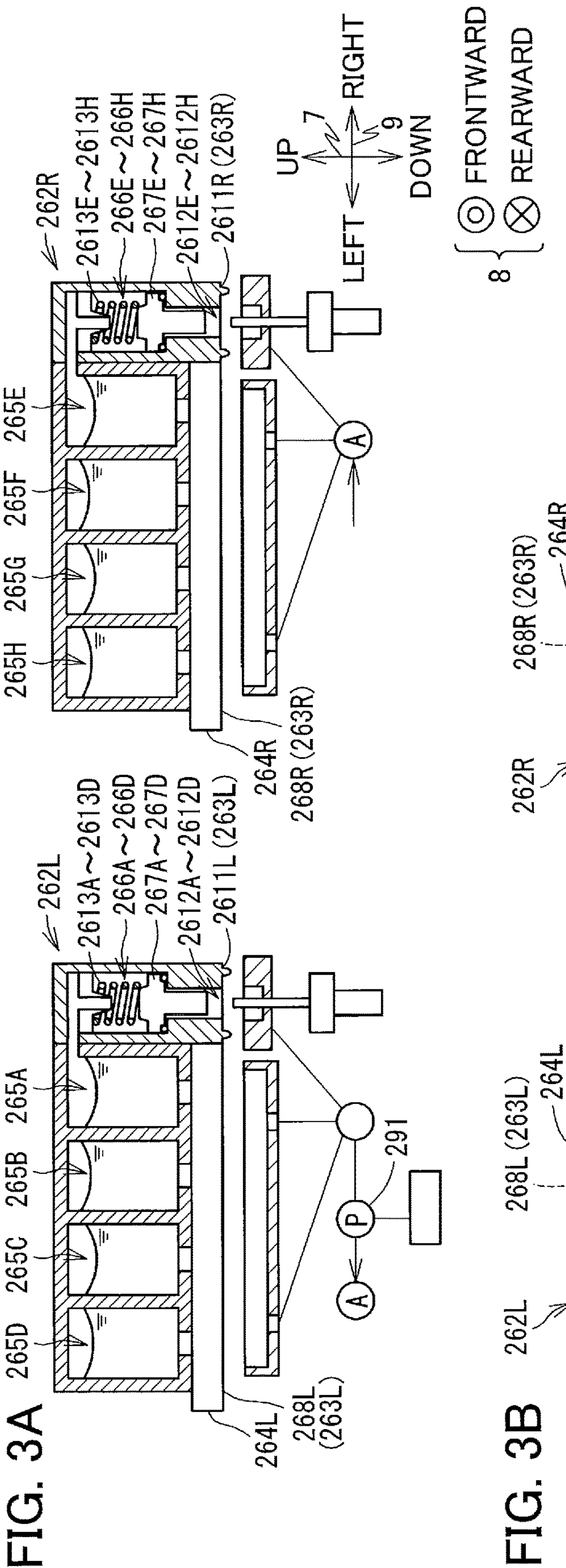
FIG. 3A is a schematic cross-sectional view of recording heads 262L, 262R provided in the printer 100.
Figure 3B:
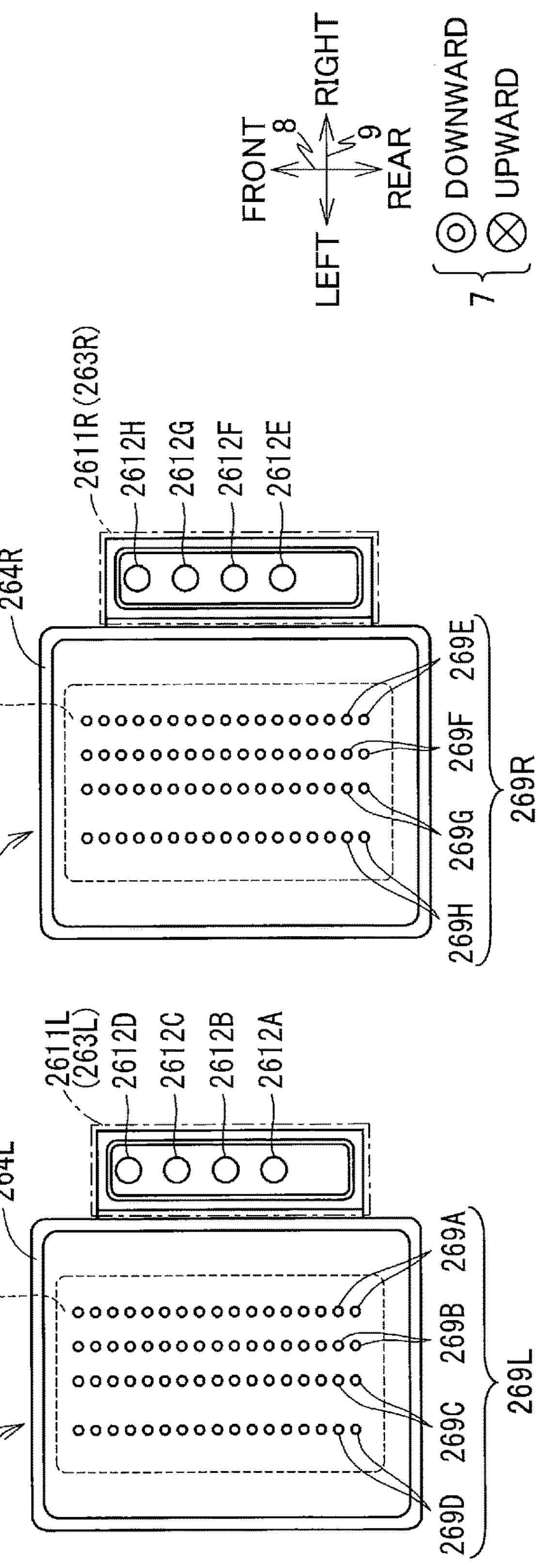
FIG. 3B is a schematic bottom view of the recording heads 262L, 262R.

FIG. 3B illustrates the lower surfaces 263L, 263R of the respective recording heads 262L, 262R. The shape of the lower surfaces 263L, 263R is generally coincident with the shape (plan view shape) of the HD through-holes 261L, 261R.

As illustrated in FIG. 3A, the recording head 262L includes an ejection module 264L, four sub-tanks 265A-265D, four exhaust passages 266A-266D, four valves 267A-267D, and four urging members 2613A-2613D.

Referring to FIG. 3A, the ejection module 264L constitutes a lower end portion of the recording head 262L. The ejection module 264L has a lower surface constituting a part of the lower surface 263L of the recording head 262L. The lower surface of the ejection module 264L includes a first region 268L having a generally rectangular shape in a plan view.

A plurality of nozzles 269L is formed in the first region 268L. Each nozzle 269L is open downward at the first region 268L. The nozzles 269L are arranged in lines at regular intervals in the front-rear direction 8 and the left-right direction 9 to form four nozzle arrays 269A-269D. The four nozzle arrays 269A-269D are juxtaposed with one another in the left-right direction 9, while each nozzle array 269A, 269B, 269C, 269D extends in the front-rear direction 8.

Each of the nozzles 269L is configured to eject liquid (for example, ink) stored in the ejection module 264L for image recordation. Specifically, the nozzle arrays 269A-269D are configured to eject ink of the colors of Y, M, C and K, respectively. Further, the nozzles 269L are also used for forcibly ejecting the liquid (ink) trapped therein to a cap unit 287L (hereinafter may also be referred to as "CP unit", see FIG. 8) in a purging process, as will be described later.

Referring to FIG. 3A, the four sub-tanks 265A-265D are provided at an upper surface of the ejection module 264L. The four sub-tanks 265A-265D are arrayed with each other in the left-right direction 9. Each of the sub-tanks 265A-265D defines therein an internal space for storing liquid (ink). The sub-tanks 265A-265D are respectively connected to the tanks 20A-20D (FIG. 1) through tube joints 2610A-2610D (see FIGS. 4 and 7). The sub-tanks 265A-265D respectively store ink of the corresponding color Y, M, C, K and function to supply the respective ink to the ejection module 264L. As the ejection module 264L consumes the ink therein by ejection through the nozzles 269L, ink of the corresponding color is configured to be supplied to the corresponding sub-tank 265A, 265B, 265C, 265D from the corresponding tank 20A, 20B, 20C, 20D.

Referring to FIG. 3B, the lower surface 263L of the recording head 262L further includes a second region 2611L at a position rightward of the first region 268L. The second region 2611L has a rectangular shape elongated in the front-rear direction 8 in a plan view. Four vent holes 2612A-2612D are formed in the second region 2611L such that the vent holes 2612A-2612D are arrayed in the front-rear direction 8. The vent holes 2612A-2612D are configured to discharge internal fluid (gas and liquid) remaining in the respective sub-tanks 265A-265D to the CP unit 287L (FIG. 6) in the purging process.

The exhaust passages 266A-266D are mainly configured to discharge gas remaining in the respective sub-tanks 265A-265D to an outside of the recording head 262L. In FIG. 3A, only the single exhaust passage 266A is depicted, and remaining three exhaust passages 266B-266D are positioned rearward of the exhaust passage 266A and are hidden by the exhaust passage 266A. Likewise, in FIG. 3A, the valves 267B-267D are also hidden by the valve 267A.

The exhaust passages 266A-266D extend from upper internal portions of the respective sub-tanks 265A-265D to the respective vent holes 2612A-2612D. Specifically, the exhaust passages 266A-266D extend rightward from the upper internal portions of the respective sub-tanks 265A-265D, and then extend downward at positions rightward of the sub-tank 265A to the respective vent holes 2612A-2612D.

The valves 267A-267D are accommodated in the exhaust passages 266A-266D, respectively, at positions above the respective vent holes 2612A-2612D. Each of the valves 267A-267D are movable between a closed position (FIG. 3A) for closing the corresponding vent hole 2612A, 2612B, 2612C, 2612D and an open position (not illustrated) for opening corresponding vent hole 2612A, 2612B, 2612C, 2612D. The open position is upwardly spaced apart from the closed position. The valves 267A-267D are urged toward the respective closed positions by the respective urging members 2613A-2613D.

As illustrated in FIGS. 3A and 3B, the recording head 262R includes an ejection module 264R, four sub-tanks 265E-265H, four exhaust passages 266E-266H, four valves 267E-267H, four vent holes 2612E-2612H, and four urging members 2613E-2613H. In FIG. 3B, the ejection module 264R constitutes a lower end portion of the recording head 262R. The ejection module 264R has a lower surface constituting a part of the lower surface 263R of the recording head 262R. The lower surface of the ejection module 264R includes a first region 268R having a generally rectangular shape in a plan view. A plurality of nozzles 269R (forming nozzle arrays 269E-269H) are formed in the first region 268R. The lower surface 263R of the recording head 262R further includes a second region 2611R at a position rightward of the first region 268R. The recording head 262R has the same configuration as the recording head 262L except for the position in the internal space 11. Therefore, further description as to the recording head 262R will be omitted.

Figure 5A:
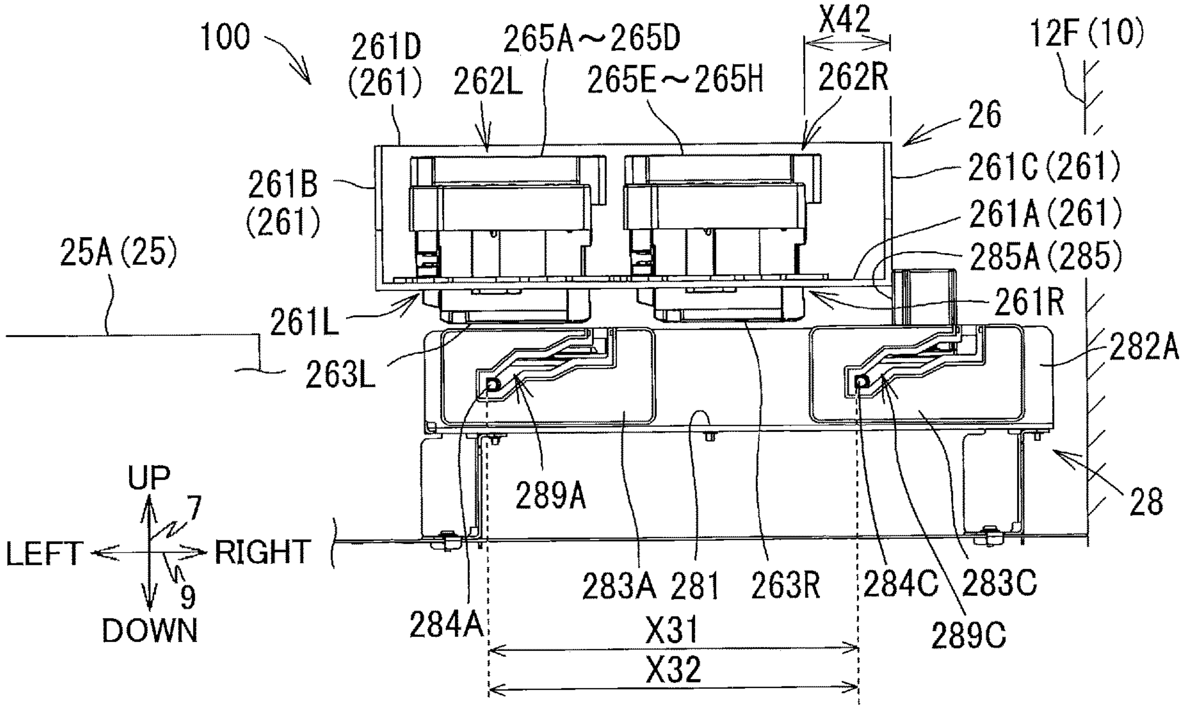
FIG. 5A is a front view of the recording unit 26 and the capping mechanism 28 in a state where ASSY protrusions 284A, 284C are at a lowermost position P11 thereof.

As illustrated in FIGS. 4 and 5A, the recording heads 262L, 262R are attached to the base wall 261A of the carriage 261. Specifically, the lower surfaces 263L, 263R of the recording heads 262L, 262R protrude downward from the base wall 261A through the respective HD through-holes 261L, 261R. The lower surfaces 263L, 263R of the recording heads 262L, 262R are respectively spaced away from the support surface 25A of the platen 25 by the same distance as each other. As illustrated in FIG. 2A, the recording head 262R is positioned rightward and frontward of the recording head 262L such that the recording head 262R is spaced apart from the recording head 262L by the distance X11 in the left-right direction 9, and by the distance Y11 in the front-rear direction 8.

<Carriage Conveying Mechanism 27>

Referring to FIG. 2A, the carriage conveying mechanism 27 includes a pair of rails 271B, 271F, two pulleys 272L, 272R, an endless belt 273, and a carriage motor 274 (also see FIG. 2B).

Each of the rails 271B, 271F is positioned above the platen 25 and extends in the left-right direction 9. The rails 271B, 271F are spaced away from each other in the front-rear direction 8, such that the platen 25 is positioned between the rails 271B and 271F. The rails 271B, 271F have right ends positioned rightward of the right end of the platen 25. That is, the carriage 261 is movable to a position further rightward than the right end of the platen 25 with respect to the left-right direction 9. The carriage 261 is spanned between the rails 271B and 271F.

The pulleys 272L, 272R are positioned adjacent to the left and the right end portions of the rail 271B, respectively. Particularly, the pulley 272R is positioned rightward of the right end of the platen 25. The pulleys 272L, 272R are provided on top of the rail 271B such that each of the pulleys 272L, 272R is rotatable about a rotational axis extending in the up-down direction 7.

The endless belt 273 is mounted over the pulleys 272L, 272R under tension. The carriage 261 is fixed to the endless belt 273 at a position between the pulleys 272L and 272R in the left-right direction 9.

The carriage motor 274 is, for example, a DC motor having brushes. The carriage motor 274 is configured to rotate under control of the controller 29 (FIG. 2B). The carriage motor 274 includes an output shaft connected to the pulley 272R for rotating the pulley 272R. The endless belt 273 is thus movable with respect to the left-right direction 9 between the pulleys 272L and 272R, so that the carriage 261 is reciprocally movable in the left-right direction 9 within a movable range 261E. Preferably, the left end of the movable range 261E be positioned slightly rightward of the left wall 12E of the housing 10, and the right end of the movable range 261E be positioned slightly leftward of the right wall 12F of the housing 10.

<Capping Mechanism 28>

A fabricated sheet metal article illustrated in FIGS. 4 through 7 is provided in the internal space 11. The sheet metal article includes a base wall 281, a front wall 282A, and a rear wall 282B. As illustrated in FIG. 5A, the base wall 281 is positioned rightward of the platen 25, and lower than the support surface 25A of the platen 25 in the up-down direction 7. The base wall 281 is fixed in position relative to the housing 10. The base wall 281 occupies a region overlapping with a region occupied by the platen 25 in the front-rear direction 8. Incidentally, in FIGS. 5A and 5B, a major part of the recording unit 26 is omitted.

Figure 6:
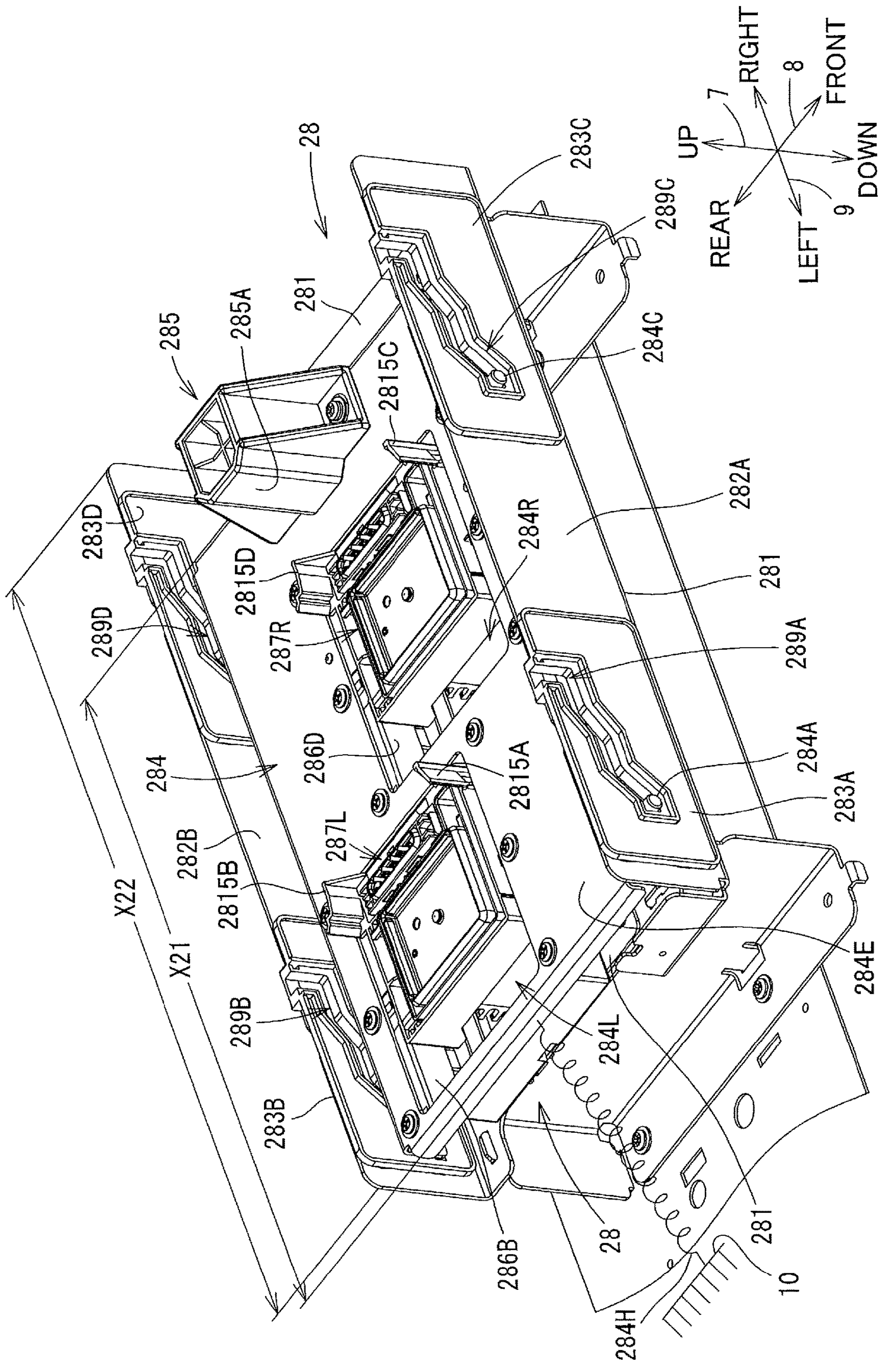
FIG. 6 is a perspective view of the capping mechanism 28.
Figure 7:
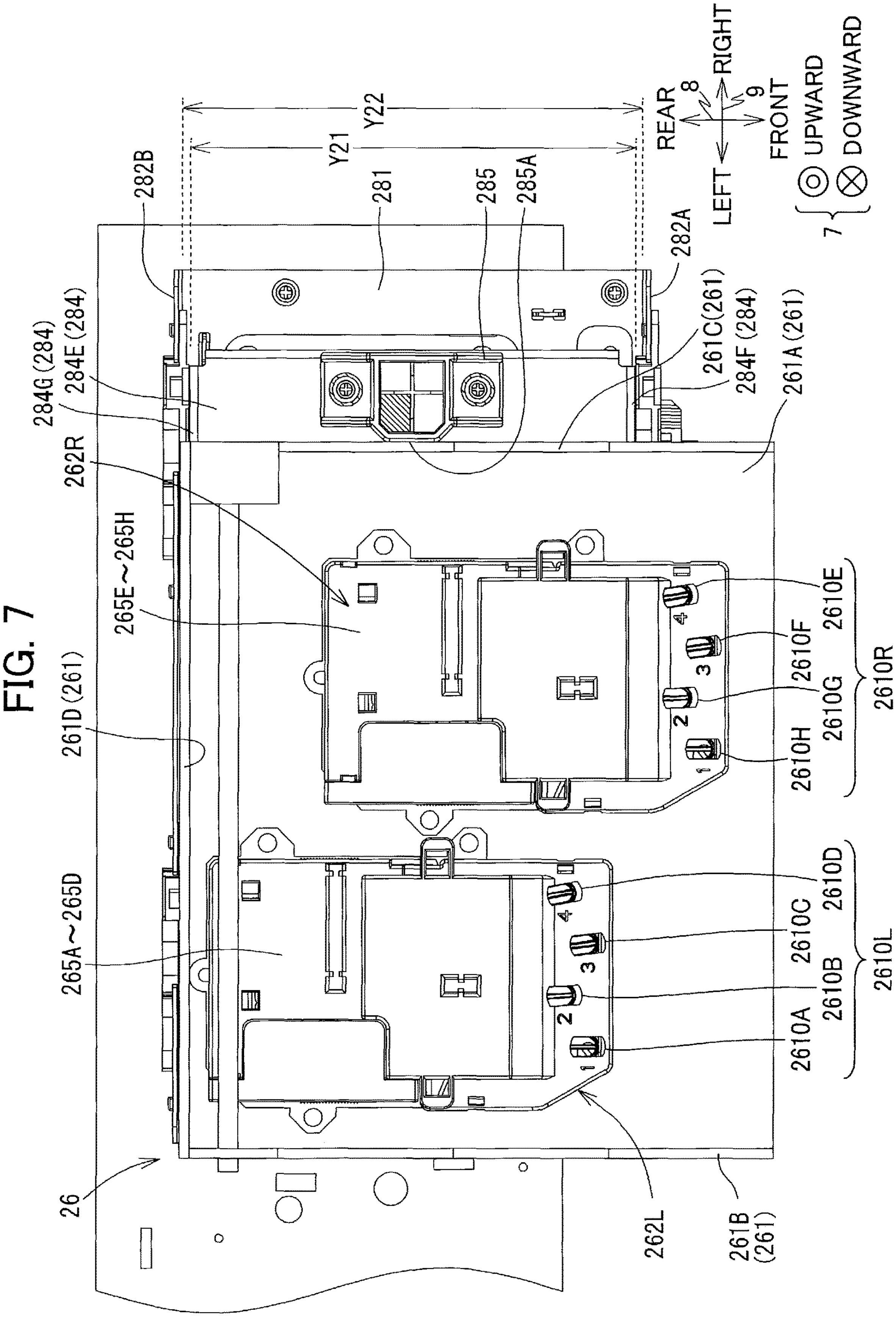
FIG. 7 is a plan view of the recording unit 26 and the capping mechanism 28.

As illustrated in FIG. 6, the base wall 281 has a generally rectangular shape in a plan view having a pair of sides in the front-rear direction 8 parallel to each other and another pair of sides in the left-right direction 9 parallel to each other. The front wall 282A and the rear wall 282B extend upward from front and the rear ends of the base wall 281, respectively, and are thin in the front-rear direction 8. As illustrated in FIG. 7, the front wall 282A is positioned frontward of the recording head 262L, and the rear wall 282B is positioned rearward of the recording head 262L. The front wall 282A and the rear wall 282B extend in the up-down direction 7 and in the left-right direction 9.

As illustrated in FIGS. 4 through 7, the capping mechanism 28 includes four ASSY guide members 283A-293D, a plate ASSY 284, an ASSY abutment member 285, four cap guide members 286A-286D, and two CP units 287L, 287R.

ASSY Guide Members 283A-293D

Referring to FIG. 5, each of the ASSY guide members 283A-293D is a molded article made from resin, for example, and has a shape substantially identical to one another.

As illustrated in FIGS. 4 through 6, the ASSY guide member 283A is provided at a position leftward of a center of the front wall 282A in the left-right direction 9 and adjacent to a left end portion of the front wall 282A. The ASSY guide member 283A is a plate-like member which is thin in the front-rear direction 8, and has a rectangular shape extending in the up-down direction 7 and the left-right direction 9 in a front view. The ASSY guide member 283A has an upper end extending linearly in the left-right direction 9 and positioned slightly above an upper end of the front wall 282A in a front view. Incidentally, the upper end of the ASSY guide member 283A may be aligned with the upper end of the front wall 282A.

Figure 8A:
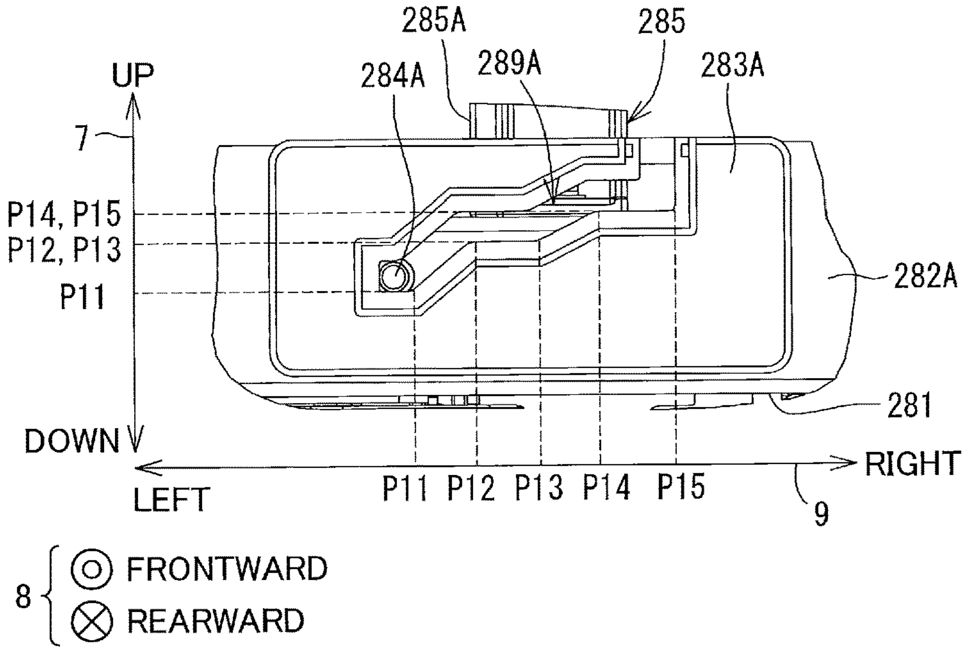
FIG. 8A is a front view of an ASSY guide member 283A in the capping mechanism 28.

As illustrated in FIG. 8A, the ASSY guide member 283A is formed with an ASSY guide slot 289A extending in two directions, i.e., in the front-rear direction 8 and the up-down direction 7. The ASSY guide slot 289A is a through-hole that penetrates through a thickness of the ASSY guide member 283A in the front-rear direction 8. However, the ASSY guide slot 289A may be provided in a form of a groove. The ASSY guide slot 289A has, throughout an entire left-right length thereof, a constant width (dimension in the up-down direction 7) which is slightly greater than an outer diameter of an ASSY protrusion 284A (described later). The front wall 282A is formed with a through-hole whose shape and position conform to the shape and position of the ASSY guide slot 289A.

Specifically, as illustrated in FIG. 8A, the ASSY guide slot 289A has a step-like configuration including a first horizontal portion (from its leftmost end to a position P11), a first sloped portion (from the position P11 to a position P12), a second horizontal portion (from the position P12 to a position P13), a second sloped portion (from the position P13 to a position P14), and a third horizontal portion (from the position P14 to a position P15). The first horizontal portion is a lowermost portion of the ASSY guide slot 289A and has a leftmost end of the ASSY guide slot 289A. That is, the first horizontal portion extends rightward from the leftmost end by a length approximately equal to the outer diameter of the ASSY protrusion 284A to a position P11. That is, the position P11 is at the lowermost portion in the ASSY guide slot 289A (the position 11 will be referred to as "lower position P11").

The first sloped portion extends diagonally upward and rightward from a right end of the first horizontal portion (the lower position P11) to the position P12. That is, the position P12 is remote upward and rightward from the lower position P11 (the position 12 will be referred to as "intermediate position P12"). The second horizontal portion extends rightward from a right end of the first sloped portion (the intermediate position P12) to the position P13 ("intermediate position P13"). The second sloped portion extends diagonally upward and rightward from a right end of the second horizontal portion (the intermediate position P13) to the position P14. That is, the position P14 is remote upward and rightward from the intermediate position P13 (the position 14 will be referred to as "upper position P14".). The third horizontal portion is an uppermost portion of the ASSY guide slot 289A, and extends rightward from a right end of the second sloped portion (the upper position P14) to the position P15 ("upper position P15"). The upper position P15 is at a rightmost portion in the ASSY guide slot 289A.

Summing up, a vertical positional relationship among the positions P11 through P15 is expressed as follows:

$$P11<P12=P13<P14=P15$$

Referring to FIG. 6, the ASSY guide member 283B is positioned on the rear wall 282B at a position horizontally translated rearward from the position of the ASSY guide member 283A. That is, the ASSY guide member 283B is positioned in parallel to and rearward of the ASSY guide member 283A.

The ASSY guide member 283C is positioned to the right of the left-right center of the front wall 282A, and adjacent to a right end portion of the front wall 282A. The ASSY guide member 283C is positioned on the front wall 282A at a position horizontally translated rightward from the position of the ASSY guide member 283A. As illustrated in FIG. 5A, an interval in the left-right direction 9 between the ASSY guide member 283A and the ASSY guide member 283C is approximately equal to a widthwise length in the left-right direction 9 of the lower surface 263R of the recording head 262R.

Referring to FIG. 6, the ASSY guide member 283D is positioned on the rear wall 282B at a position horizontally translated rearward from the position of the ASSY guide member 283C.

The ASSY guide members 283B through 283D are respectively formed with ASSY guide slots 289B-289D whose shapes are identical to the shape of the ASSY guide slot 289A. The front wall 282A is further formed with a through-hole whose shape and position conform to the shape and position of the ASSY guide slot 289C. Likewise, the rear wall 282B is formed with two slots whose shape and positions conform to the shape and positions of the ASSY guide slots 289B, 289D of the ASSY guide members 283B, 283D.

Plate ASSY 284

Figure 8B:
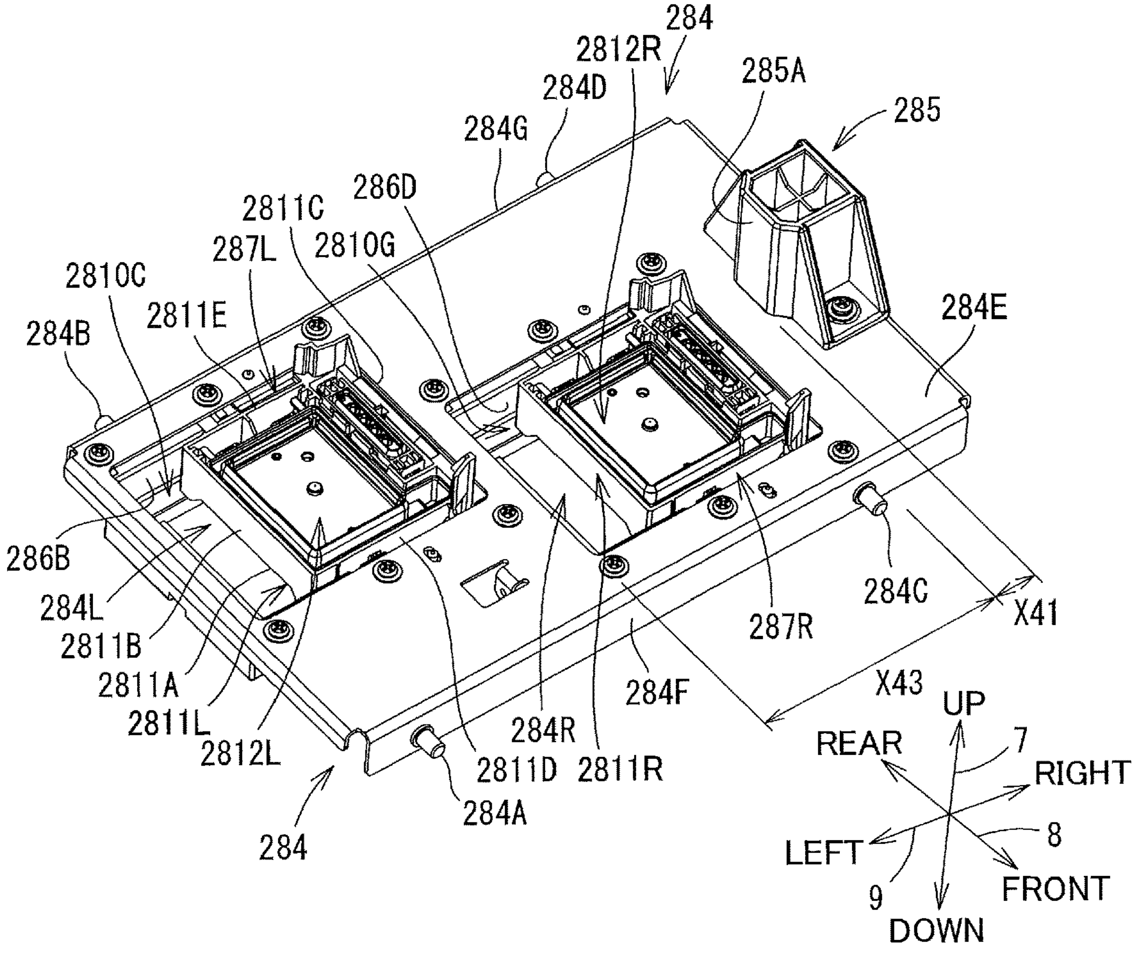
FIG. 8B is a perspective view of a plate ASSY 284 in the capping mechanism 28.

Referring to FIGS. 6, 7 and 8B, the plate ASSY 284 is a fabricated sheet metal, and includes four ASSY protrusions 284A-284D, an upper panel 284E, a front panel 284F, and a rear panel 284G. As illustrated in FIG. 6, the plate ASSY 284 further includes an ASSY urging member 284H.

As illustrate in FIGS. 6 and 8B, the upper panel 284E has a generally rectangular shape in a plan view having a pair of sides extending in parallel to each other in the front-rear direction 8 and another pair of sides extending in parallel to each other in the left-right direction 9. As illustrated in FIG. 7, the plate ASSY 284 has a dimension Y21 in the front-rear direction 8 slightly smaller than a gap distance Y22 between the front wall 282A and the rear wall 282B in the front-rear direction 8. Further, as illustrated in FIG. 6, the upper panel 284E has a dimension X21 in the left-right direction 9 slightly smaller than a dimension X22 in the left-right direction 9 of each of the front wall 282A and the rear wall 282B.

As illustrated in FIG. 8B, the front panel 284F and the rear panel 284G extend downward from front and rear ends of the upper panel 284E, respectively. The front panel 284F and the rear panel 284G are plate-like shaped which are thin in the front-rear direction 8. The front panel 284F and the rear panel 284G have a generally rectangular shape elongated in the left-right direction 9 in a front view.

As illustrated in FIG. 8B, the ASSY protrusions 284A-284D are solid cylindrical, and have outer diameters slightly smaller than the vertical dimension of the respective ASSY guide slots 289A-289D (see FIGS. 6 and 8A). The ASSY protrusions 284A and 284C protrude frontward from left and right end portions of the front panel 284F, respectively. Referring to FIG. 5A, a distance X31 in the left-right direction 9 between a left end of the ASSY protrusion 284A and a left end of the ASSY protrusion 284C is approximately equal to a distance X32 between the left end of the ASSY guide slot 289A and the left end of the ASSY guide slot 289C. Referring to FIG. 8B, the ASSY protrusions 284B and 284D protrude rearward from the rear panel 284G at positions parallelly translated rearward from the positions of the ASSY protrusions 284A and 284C, respectively.

As illustrated in FIG. 6, the ASSY protrusions 284A-284D are respectively inserted in the ASSY guide slots 289A-289D. Hence, the plate ASSY 284 is movable in the up-down direction 7 and the left-right direction 9, between the front wall 282A and the rear wall 282B, through the guide by the ASSY guide slots 289A-289D. That is, movement of the plate ASSY 284 is regulated by the shape of the ASSY guide slots 289A-289D.

Figure 5B:
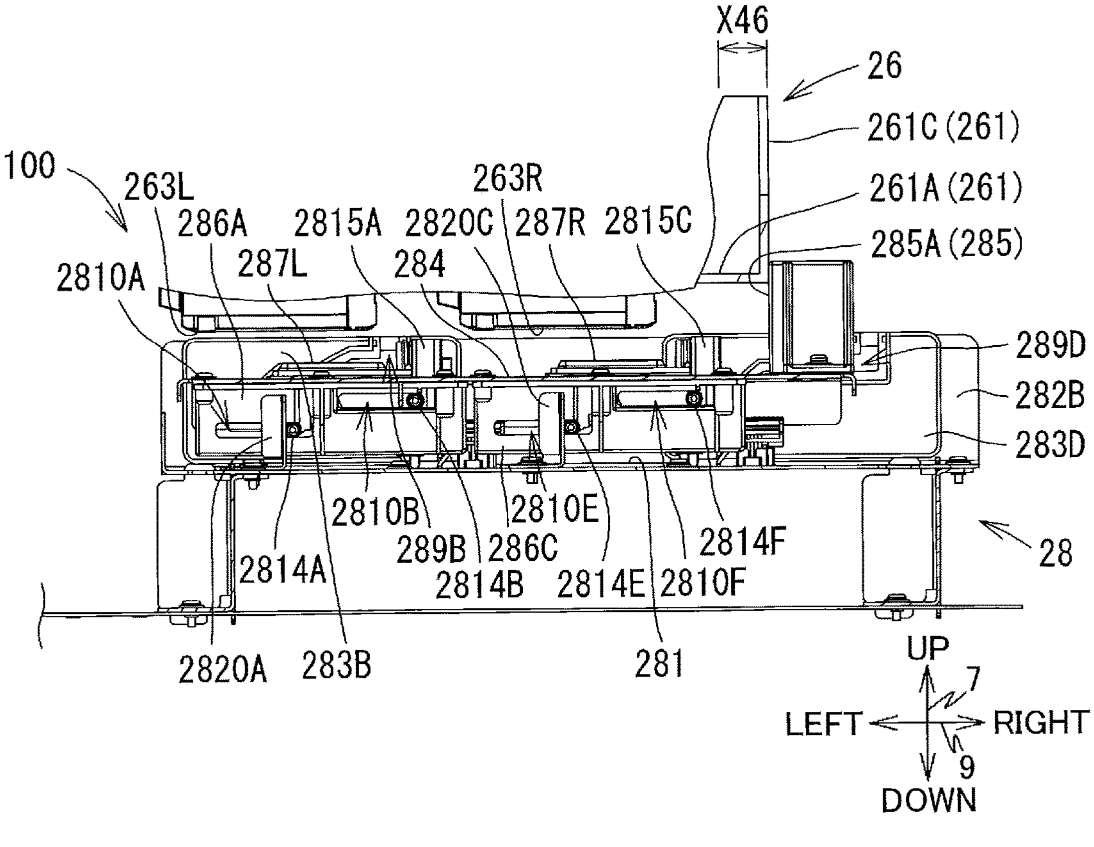
FIG. 5B is a partial cross-sectional view of the recording unit 26 and the capping mechanism 28 illustrated in FIG. 5A.

As described later, the CP unit 287L includes CP abutment members 2815A, 2815B, and the CP unit 287R includes CP abutment members 2815C, 2815D (see FIG. 6). When the ASSY protrusions 284A-284D are positioned at the lower position P11 (see FIG. 8A), the CP abutment members 2815A-2815D do not protrude further upward relative to upper ends of the respective ASSY guide members 283A-283D, as illustrated in FIGS. 5A and 5B. In FIGS. 5A and 5B, the ASSY guide members 283B, 283D are respectively positioned rearward of the ASSY guide members 283A, 283C and are hidden behind thereby; and the ASSY protrusions 284B, 284D are respectively positioned rearward of the ASSY protrusions 284A, 284C, and are hidden behind thereby. The same is true with respect to FIGS. 11A through 13B.

Figure 11A:
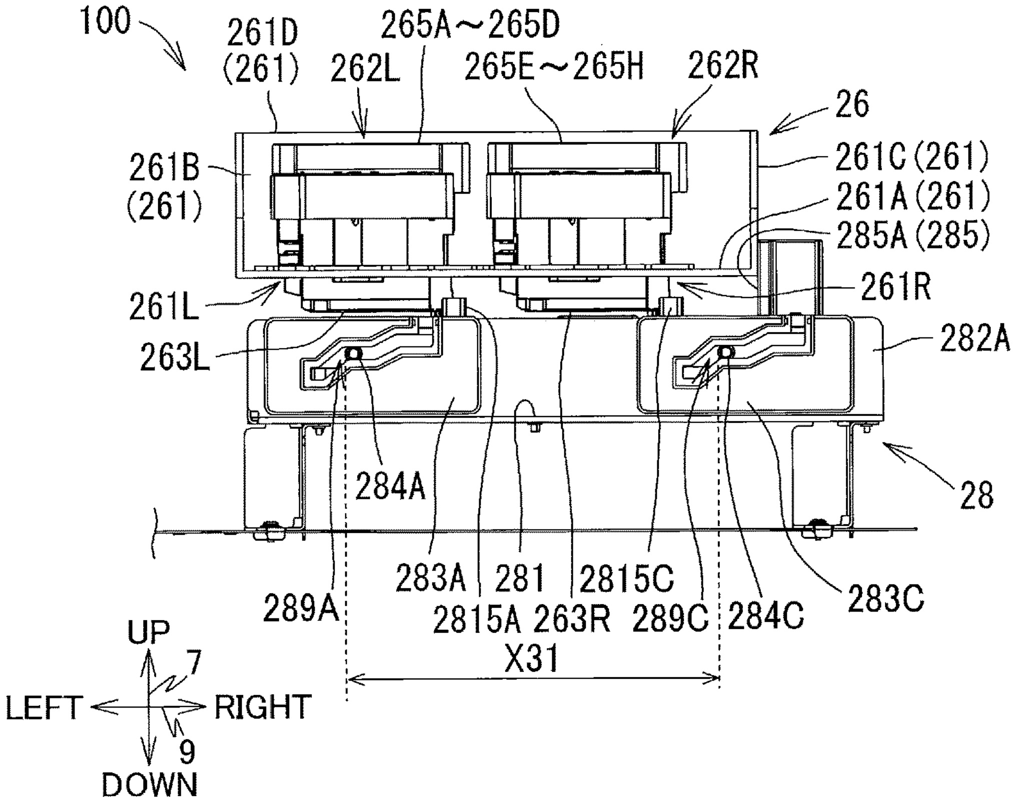
FIG. 11A is a front view of the recording unit 26 and the capping mechanism 28 in a state where the ASSY protrusions 284A, 284C are respectively at positions near an intermediate position P12.
Figure 11B:
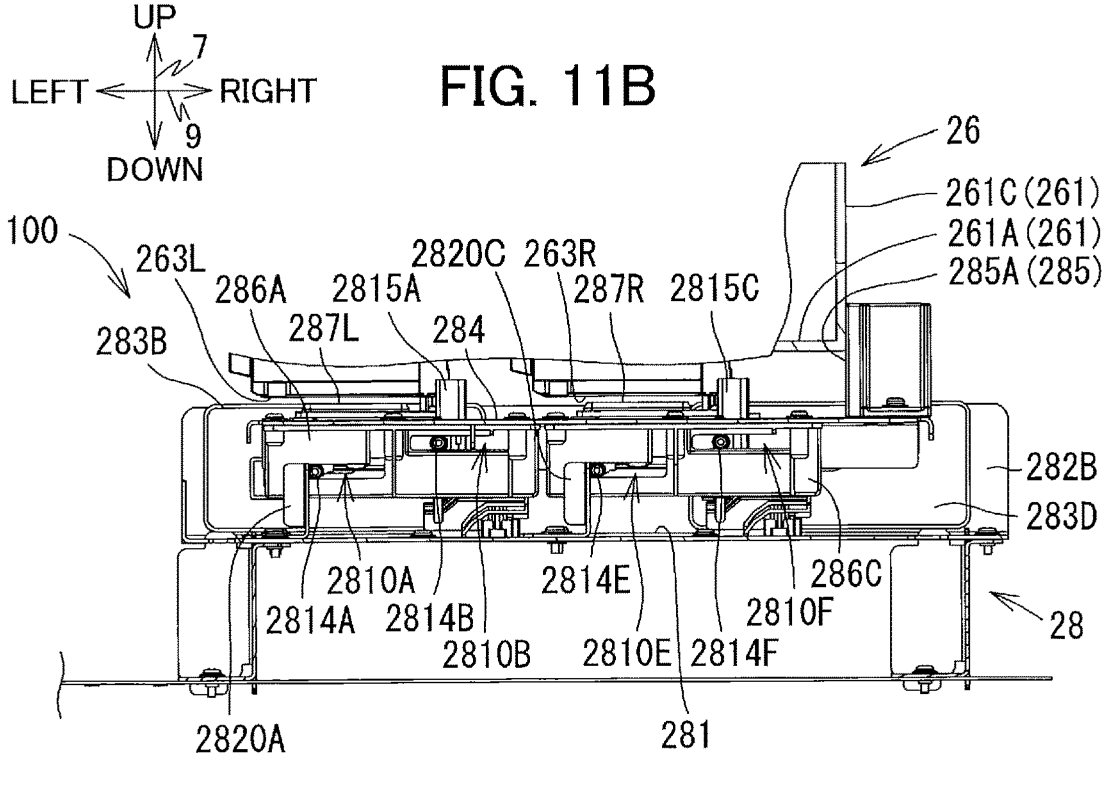
FIG. 11B is a partial cross-sectional view of the recording unit 26 and the capping mechanism 28 illustrated in FIG. 11A.

Referring to FIGS. 11A and 11B, when the ASSY protrusions 284A-284D are respectively at positions adjacent to the intermediate position P12 (see FIG. 8A), the CP abutment members 2815A-2815D protrude further upward than the upper ends of the respective ASSY guide members 283A-283D. Further, upper ends of the respective CP abutment members 2815A-2815D are positioned above the lower surfaces 263L, 263R of the recording heads 262L, 262R.

Figure 12A:
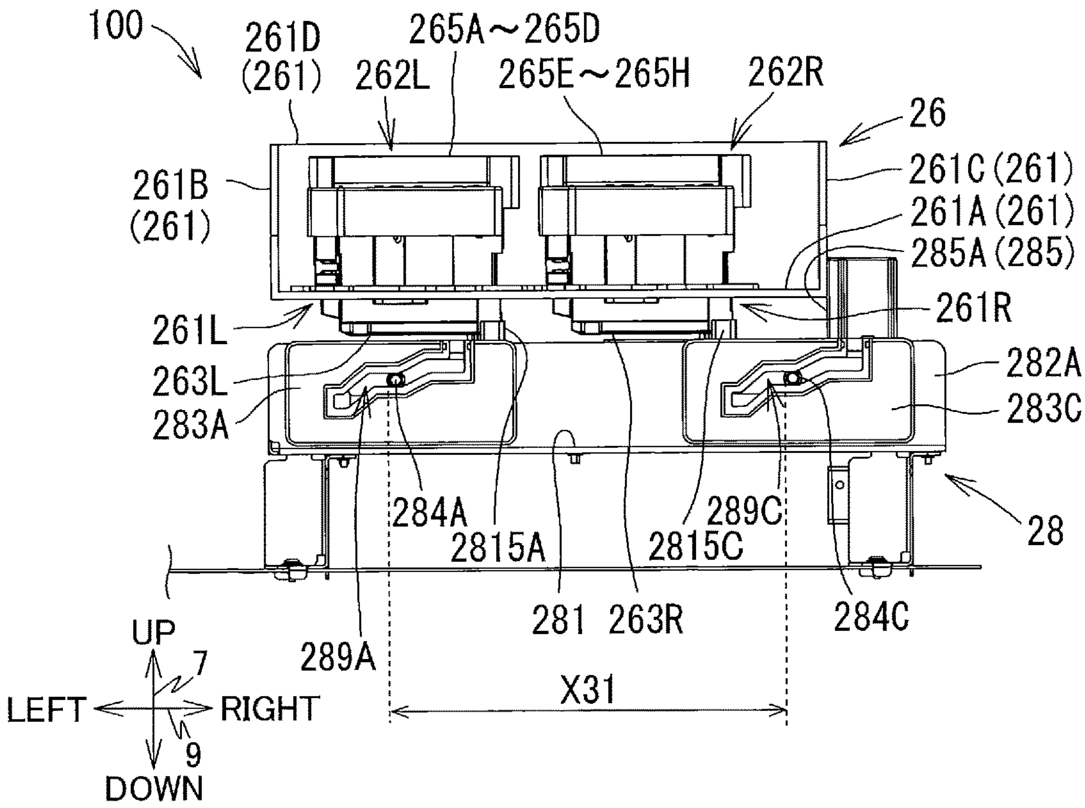
FIG. 12A is a front view of the recording unit 26 and the capping mechanism 2 in a state where the ASSY protrusions 284A, 284C are respectively at positions near an intermediate position P13.
Figure 12B:
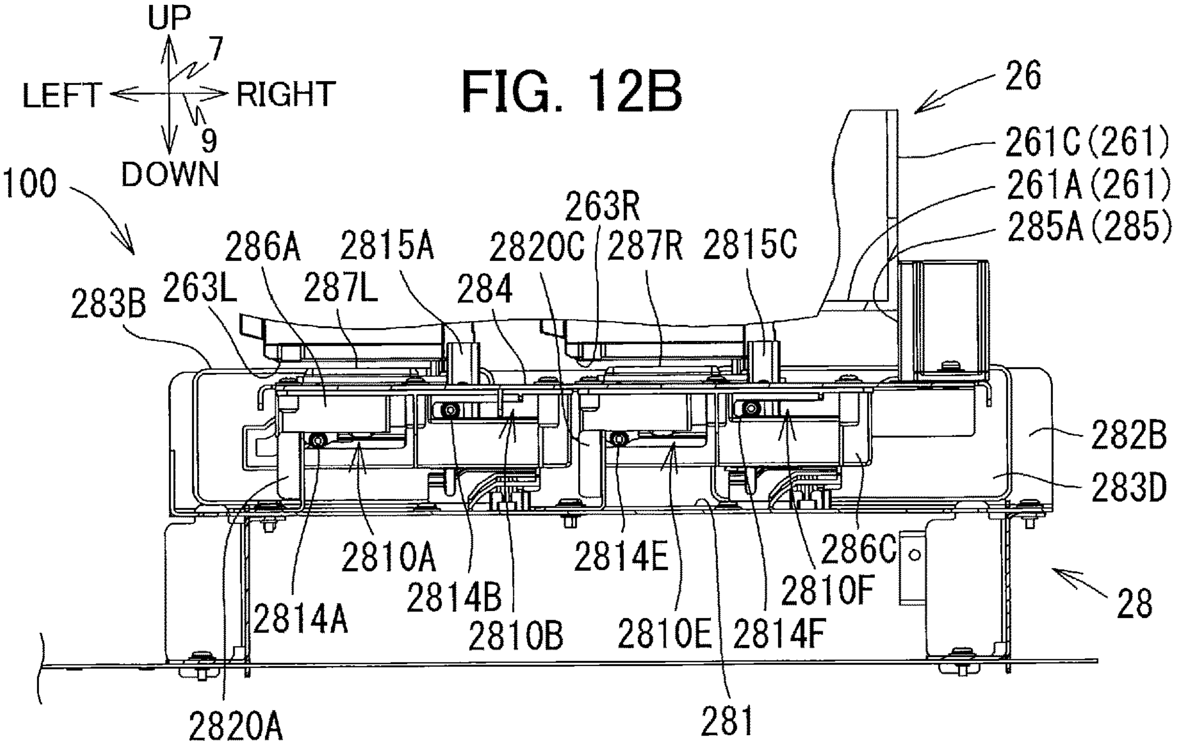
FIG. 12B is a partial cross-sectional view of the recording unit 26 and the capping mechanism 28 illustrated in FIG. 12A.

Referring to FIGS. 12A and 12B, when the ASSY protrusions 284A-284D are at positions adjacent to the intermediate position P13 (see FIG. 8A), the CP abutment members 2815A-2815D are at the same vertical positions as those when the ASSY protrusions 284A-284D are at positions near the intermediate position P12.

Figure 13A:
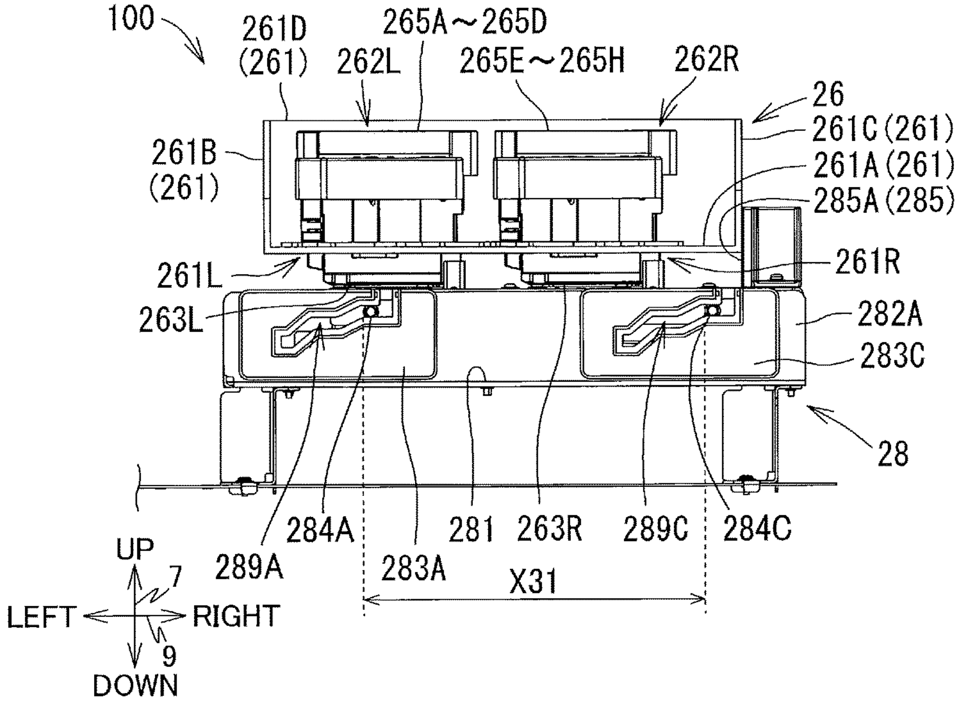
FIG. 13A is a front view of the recording unit 26 and the capping mechanism 28 in a state where the ASSY protrusions 284A, 284C are respectively at positions near an uppermost position P14.
Figure 13B:
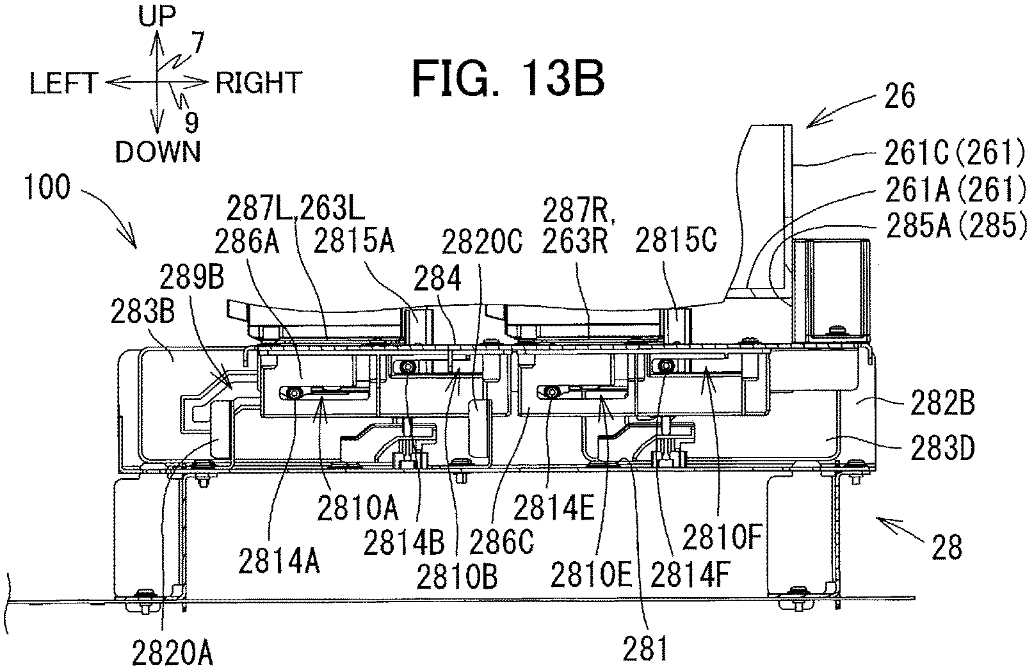
FIG. 13B is a partial cross-sectional view of the recording unit 26 and the capping mechanism 28 illustrated in FIG. 13A.

Referring to FIGS. 13A and 13B, when the ASSY protrusions 284A-284D are each at the upper position P14, P15 (see FIG. 8A), the CP abutment members 2815A-2815D protrude higher than the upper ends of the respective ASSY guide members 283A-283D and also higher than the lower surfaces 263L, 263R of the recording heads 262L, 262R.

As illustrated in FIG. 8B, the upper panel 284E is formed with two through-holes 284L, 284R (hereinafter, may also be referred to as "CP through-holes 284L, 284R) for the respective CP units 287L, 287R. Each of the CP through-holes 284L, 284R extends throughout a thickness of the upper panel 284E in the up-down direction 7. The CP through-holes 284L and 284R have a shape identical to each other. Specifically, the CP through-holes 284L and 284R have a generally rectangular shape in a plan view, with front-rear and left-right dimensions suitable for accommodating the CP units 287L and 287R therein, respectively.

Referring to FIG. 8B, a right edge of the CP through-hole 284R extends in the front-rear direction 8 and is distant leftward by a distance X41 (FIG. 8B) from a left end face 285A of the ASSY abutment member 285 (described later). The distance X41 in the left-right direction 9 is slightly smaller than a distance X42 in the left-right direction 9 (see FIG. 5A) between a right edge of the HD through-hole 261R (i.e., the right end of the lower surface 263R of the recording head 262R) and the right side wall 261C of the carriage 261.

A left edge of the CP through-hole 284R extends in parallel to the right edge of the CP through-hole 284R and is distant therefrom leftward by a distance X43 (see FIG. 8B). Here, the distance X43 is approximately equal to a sum of a dimension X44 and a length X45 (i.e., X44+X45), where the dimension X44 (see FIG. 10) represents a dimension in the left-right direction 9 of the CP unit 287R, and the length X45 (see FIG. 9A) represents a length in the left-right direction 9 of a CP guide slot 2810A (described later).

The CP through-hole 284L is formed at such a position displaced from the CP through-hole 284R leftward by the distance X11 (see FIG. 2A) and rearward by the distance Y11 (see FIG. 2A).

As illustrated in FIG. 6, the ASSY urging member 284H is a tension coil spring. The ASSY urging member 284H has one end connected to the upper panel 284E, and another end connected to the housing 10 at a position leftward of the upper panel 284E. The ASSY urging member 284H has a length greater than its natural length in a state where the ASSY protrusions 284A-284D are at the lower position P11 (see FIG. 8A). Hence, the plate ASSY 284 is normally urged leftward by the urging force of the ASSY urging member 284H.

ASSY Abutment Member 285

As illustrated in FIG. 8B, the ASSY abutment member 285 has a shape of generally rectangular parallelepiped, and is attached to the upper surface of the upper panel 284E. The ASSY abutment member 285 protrudes upward from the upper surface of the upper panel 284E at a position near its right end and approximate center in the front-rear direction 8. The ASSY abutment member 285 has the left end face 285A facing leftward and extending in the front-rear direction 8 and the up-down direction 7.

As illustrated in FIGS. 5A and 5B, the left end face 285A has an upper end positioned above the front wall 282A, the rear wall 282B, and the base wall 261A of the carriage 261, regardless of the vertical position of the ASSY protrusions 284A-284D. Further, as illustrated in FIGS. 5A, 5B and 7, the right side wall 261C occupies a region partially overlapped with a region occupied by the left end face 285A in the up-down direction 7 and the front-rear direction 8.

CP Guide Members 286A-286D

In FIGS. 5A, 5B, 8B, 9A, 9B, and 10, each of the CP guide members 286A-286D is a molded article made from resin. The CP guide members 286A-286D have a shape substantially identical to one another. The CP guide member 286B is positioned rearward of the CP guide member 286A. The CP guide member 286B is hidden behind by the CP guide member 286A in FIG. 5A, and is partly illustrated in FIG. 8B. FIG. 8B illustrates the plate ASSY 284 and the ASSY abutment member 285, whereas the plate ASSY 284 and the ASSY abutment member 285 are not illustrated in FIG. 10.

Figure 9A:
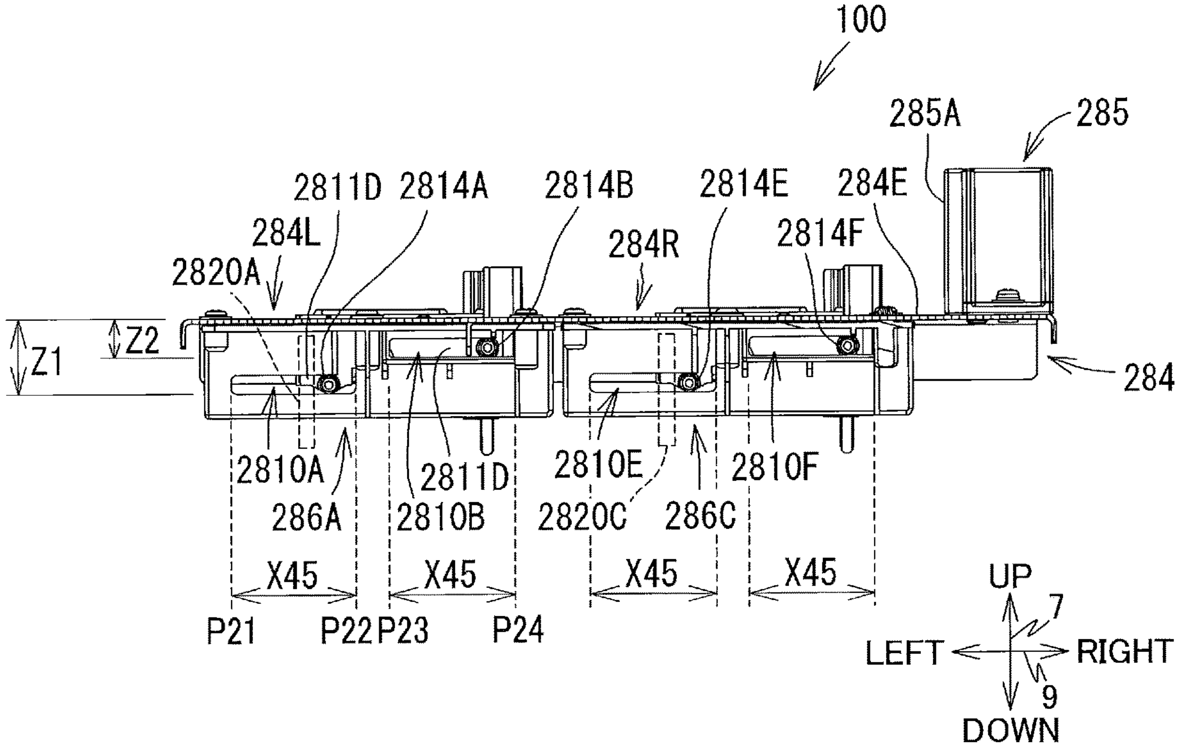
FIG. 9A is a front view of cap guide members 286A and 286C in the capping mechanism 28.
Figure 10:
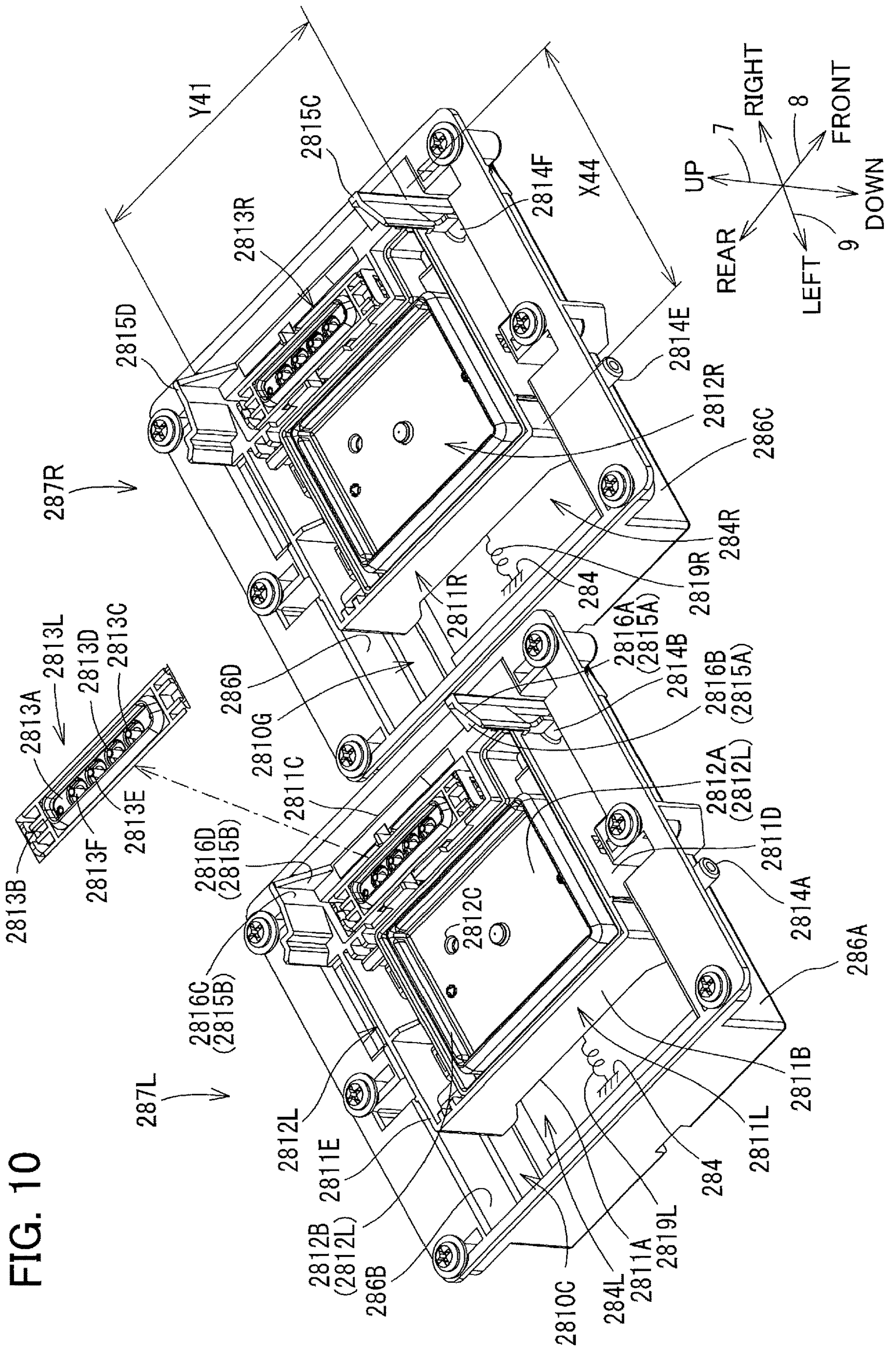
FIG. 10 is a perspective view of cap units 278L and 287R in the capping mechanism 28.

In FIGS. 9A and 10, the CP guide member 286A extends downward from the front edge of the CP through-hole 284L on the upper panel 284E. The CP guide member 286A is plate-like shaped having a thin thickness in the front-rear direction 8, and has a rectangular shape extending in the up-down direction 7 and the left-right direction 9. The CP guide member 286A is formed with two CP guide slots 2810A, 2810B extending in the left-right direction 9 and penetrating through the thickness of the CP guide member 286A in the front-rear direction 8. Each of the CP guide slots 2810A, 2810B has, throughout a substantially entire length thereof, a constant width slightly greater than an outer diameter of CP protrusions 2814A, 2814B (described later) of the CP unit 287L. The CP guide slots 2810A, 2810B have the same dimension as each other in the left-right direction 9, i.e., the length X45.

Referring to FIG. 9A, the CP guide slot 2810A linearly extends in the left-right direction 9 from a lower position P21 to a lower position P22. Each of the lower positions P21, P22 is a location distant downward from the upper surface of the upper panel 284E by a vertical distance Z1. The vertical distance Z1 is equal to a distance from the upper surface of the upper panel 284E to a lower end of the CP protrusion 2814A. The lower position P21 is approximately coincident with the left edge of the CP through-hole 284L in the left-right direction 9.

The CP guide slot 2810B linearly extends in the left-right direction 9 from an upper position P23 to an upper position P24, as illustrated in FIG. 9A. Each of the upper positions P23, P24 is a location distant downward from the upper surface of the upper panel 284E by a vertical distance Z2. The vertical distance Z2 is equal to a distance from the upper surface of the upper panel 284E to a lower end of the CP protrusion 2814B. The upper position P24 is approximately coincident with the right edge of the CP through-hole 284L in the left-right direction 9.

Figure 9B:
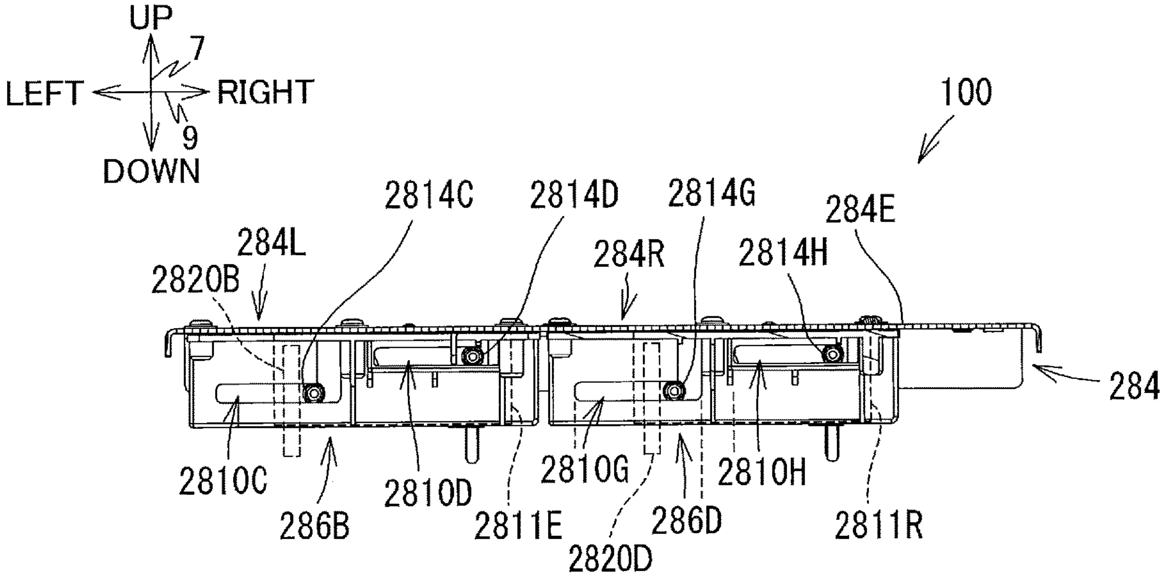
FIG. 9B is a front view of cap guide members 286B and 286D in the capping mechanism 28.

Referring to FIGS. 9B and 10, the CP guide member 286B extends downward from a rear edge of the CP through-hole 284L on the upper panel 284E. The CP guide member 286B is at a position horizontally translated rearward from the position of the CP guide member 286A.

Referring to FIGS. 9A and 10, the CP guide member 286C extends downward from a front edge of the CP through-hole 284R on the upper panel 284E. The CP guide member 286C is at a position parallelly translated rightward from the position of the CP guide member 286A.

Referring to FIGS. 9B and 10, the CP guide member 286D extends downward from a rear edge of the CP through-hole 284R on the upper panel 284E. The CP guide member 286D is at a position parallelly translated rearward from the position of the CP guide member 286C.

Referring to FIGS. 9A and 9B, the CP guide member 286B is formed with two CP guide slots 2810C, 2810D; the CP guide member 286C is formed with two CP guide slots 2810E, 2810F; and the CP guide member 286D is formed with two CP guide slots 2810G, 2810H. The CP guide slots 2810C through 2810H have the same shape as the CP guide slot 2810A.

CP Units 287L, 287R

As illustrated in FIG. 10, the CP units 287L, 287R have the same shape as each other. The CP units 287L, 287R are supported by the plate ASSY 284 and are movable in the left-right direction 9 relative to the plate ASSY 284.

The CP unit 287L includes a CP case 2811L, a nozzle cap 2812L, a vent cap 2813L, the CP protrusions 2814A-2814D, the two CP abutment members 2815A, 2815B, and a CP urging member 2819L.

The CP case 2811L has a tray-like shape defining an upper open end. The CP case 2811L has a dimension Y41 in the front-rear direction 8, and the dimension X44 in the left-right direction 9. The CP case 2811L includes a bottom wall 2811A, and peripheral walls 2811B, 2811C, 2811D, and 2811E.

The bottom wall 2811A has a rectangular shape in a plan view. The peripheral walls 2811B, 2811C, 2811D, 2811E extend upward from left, right, front and rear edges of the bottom wall 2811A, respectively. The peripheral wall 2811D, 2811E are positioned along the front and the rear edges of the CP through-hole 284L and in parallel to the front and rear sides of the upper panel 284E. The peripheral walls 2811B through 2811E have upper ends flush with the upper surface of the upper panel 284E, as illustrated in FIG. 8B.

Referring to FIG. 10, the nozzle cap 2812L includes a base portion 2812A and a lip 2812B. The base portion 2812A constitutes a bottom portion of the nozzle cap 2812L, and has a rectangular shape in a plan view. The base portion 2812A is formed with an outlet hole 2812C.

The lip 2812B is made from elastic material such as rubber, and has a rim-like configuration protruding upward from an outer peripheral end of the base portion 2812A. The upper end of the lip 2812B is configured to make close contact with the lower surface of the ejection module 264L such that the lip 2812B surrounds the nozzles 269L on all sides when the ASSY protrusions 284A-284D reach the upper position P14 (FIG. 8A) of the ASSY guide members 283A-283D. No intimate contact of the upper end of the lip 2812B with the lower surface of the ejection module 264L occurs prior to arrival of the ASSY protrusions 284A-284D at the upper position P14 from the lower position P11.

The vent cap 2813L includes a base portion 2813A, a lip 2813B, and four vent protrusions 2813C-2813F. The base portion 2813A constitutes a bottom portion of the vent cap 2813L, and has a rectangular shape elongated in the front-rear direction 8 in a plan view. The base portion 2813A is formed with a discharge hole (not illustrated) for discharging liquid ejected into the vent cap 2813L in the purging process.

The lip 2813B is made from elastic material such as rubber, and has a rim-like configuration protruding upward from an outer peripheral end of the base portion 2813A. The upper end of the lip 2813B is configured to make close contact with the lower surface of the ejection module 264L such that the lip 2813B surrounds the vent holes 2612A-2612D on all sides when the ASSY protrusions 284A-284D reach the upper position P14 (FIG. 8A) of the ASSY guide members 283A-283D. No intimate contact of the upper end of the lip 2813B with the lower surface of the ejection module 264L occurs prior to arrival of the ASSY protrusions 284A-284D at the upper position P14 from the lower position P11.

The vent protrusions 2813C-2813F are positioned within an area encircled by the lip 2813B, and are arrayed in the front-rear direction 8 at regular intervals. Each of the vent protrusions 2813C-2813F protrudes upward from the base portion 2813A to a position above the upper end of the lip 2813B. In a process of moving the ASSY protrusions 284A-284D toward the upper position P14 of the ASSY guide members 283A-283D, the vent protrusions 2813C-2813F are inserted through the vent holes 2612A-2612D of the recording head 262L to move the valves 267A-267D (see FIG. 3A) from the closed position to the open position.

As illustrated in FIGS. 9A and 9B, each of the CP protrusions 2814A-2814D has a generally solid cylindrical shape, and has an outer diameter slightly smaller than the vertical width of each CP guide slot 2810A-2810D in the up-down direction 7. The CP protrusions 2814A-2814D are so positioned that the cap unit 287L is horizontally movable in the left-right direction 9 within the CP through-hole 284L without causing the peripheral walls 2811B through 2811E from protruding upward than the upper surface of the upper panel 284E.

Referring to FIG. 10, the CP protrusions 2814A, 2814B protrude frontward from left and right end portions of the peripheral wall 2811D, respectively. Referring to FIG. 9B, the CP protrusions 2814C, 2814D protrude rearward from the peripheral wall 2811E at positions parallelly translated rearward from the respective positions of the CP protrusions 2814A, 2814B.

The CP protrusions 2814A, 2814B are inserted through the respective CP guide slots 2810A, 2810B of the CP guide member 286A, as illustrated in FIG. 9A. Protruding ends (i.e., front ends) of the CP protrusions 2814A, 2814B are positioned further frontward than the front surface of the CP guide member 286A. Likewise, the CP protrusions 2814C, 2814D are inserted through the respective CP guide slots 2810C, 2810D of the CP guide member 286B, as illustrated in FIG. 9B. Protruding ends (i.e., rear ends) of the CP protrusions 2814C, 2814D are positioned further rearward than the rear surface of the CP guide member 286B.

As illustrated in FIG. 10, the upper open end of the CP case 2811L has a rectangular shape in a plan view. The CP abutment member 2815A protrudes upward from a front right end corner portion of the upper end of the CP case 2811L. The CP abutment member 2815A has a sloped surface 2816A and a flat surface 2816B facing leftward. The sloped surface 2816A is a generally flat surface facing diagonally rearward and leftward. The flat surface 2816B faces leftward and extends in up-down direction 7 and front-rear direction 8.

The CP abutment member 2815B protrudes upward from a rear right end corner portion of the upper end of the CP case 2811L. The CP abutment member 2815B is positioned rearward of the CP abutment member 2815A and is spaced away therefrom. The CP abutment member 2815B has a first flat surface 2816C facing frontward and a second flat surface 2816D facing leftward. The first flat surface 2816C is a generally flat surface extending in up-down direction 7 and left-right direction 9, and faces the sloped surface 2816A of the CP abutment member 2815A in the front-rear direction 8. The second flat surface 2816D faces leftward and is a generally flat surface extending in the up-down direction 7 and the front-rear direction 8. The second flat surface 2816D is in line with the flat surface 2816B of the CP abutment member 2815A in the front-rear direction 8.

The sloped surface 2816A and the first flat surface 2816C define therebetween a distance in the front-rear direction 8 equal to the distance in the front-rear direction 8 between the lower front right corner and the lower rear right corner of the recording head 262L, i.e., the length of the right lower end of the recording head 262L.

The CP urging member 2819L is a tension coil spring. As illustrated in FIG. 10, the CP urging member 2819L has one end connected to the CP case 2811L, and another end connected to the plate ASSY 284 at a position leftward of the CP case 2811L.

Referring to FIGS. 8B, 9B and 10, the CP unit 287R includes a CP case 2811R, a nozzle cap 2812R, a vent cap 2813R, CP protrusions 2814E-2814H, two CP abutment members 2815C, 2815D, and a CP urging member 2819R. The CP unit 287R has the same configuration as the CP unit 287L, except that the CP unit 287R is displaced from the CP unit 287L rightward by the distance X11 (see FIG. 2A) and frontward by the distance Y11 (see FIG. 2A). Therefore, further description as to the CP case 2811R, the nozzle cap 2812R, the vent cap 2813R, the CP protrusions 2814E-2814H, the two CP abutment members 2815C, 2815D, and the CP urging member 2819R will be omitted.

Stoppers 2820A-2820D

As illustrated in FIGS. 5B, 9A and 9B, the printer 100 further includes stoppers 2820A-2820D. In FIG. 5B, the stoppers 2820B, 2820D are hidden behind the stoppers 2820A, 2820C. In FIGS. 9A and 9B, the stoppers 2820A-2820D are indicated by broken lines. The stoppers 2820A-2820D are fixedly attached to the base wall 281. The stoppers 2820A-2820D are made from sheet metals, for example, and have a generally rectangular shape elongated in the up-down direction 7 as viewed in the left-right direction 9. Each of the stoppers 2820A-2820D has, as a major surface, a generally flat surface facing rightward and extending in the up-down direction 7 and the front-rear direction 8.

The major surface of each stopper 2820A, 2820B occupies a range in the up-down direction 7 and front-rear direction 8 overlapped with a range that each corresponding CP protrusion 2814A, 2814C occupies in the up-down direction 7 and front-rear direction 8. Likewise, the major surface of each stopper 2820C, 2820D occupies a range in the up-down direction 7 and front-rear direction 8 overlapped with a range that each corresponding CP protrusion 2814E, 2814G occupies in the up-down direction 7 and front-rear direction 8.

<Controller 29>

As illustrated in FIG. 2B, the controller 29 includes a CPU, a ROM, a RAM, and an EEPROM, and the like. The controller 29 is configured to control the motor 21B, the motor 23C, the carriage motor 274, the recording heads 262L, 262R, and the pump 291 for performing an image recording process, the capping process, and the purging process described next.

<Image Recording Process>

In response to receipt of an input command instructing to start an image recording operation through an operation panel (not illustrated), the controller 29 controls rotations of the motors 21B, 21C to rotate the holder 21, the pair of conveyer rollers 23, and the pair of discharge rollers 24 for conveying the sheet S in the conveying direction 8A, so that a leading end of the sheet S is brought to a cueing position immediately below the ejection modules 264L, 264R.

Then, the controller 29 controls the ejection modules 264L, 264R to eject ink toward the sheet S to record an image thereon based on image data on the sheet S, while conveying the sheet S in the conveying direction 8A by controlling the holder 21, the pair of conveyer rollers 23, and the pair of discharge rollers 24 through the control over the rotations of the motors 21B, 21C.

<Capping Process>

The controller 29 is configured to start the capping process after ending the image recording process, in a case where a prescribed condition(s) for execution of the capping process is satisfied.

Prior to execution of the capping process, the right side wall 261C is positioned leftward of the left end face 285A of the ASSY abutment member 285 and faces the left end face 285A in the left-right direction 9. At this time, the ASSY protrusions 284A-284D are each at the lower position P11 (FIG. 8A), and are in abutment with the left ends of the corresponding ASSY guide slots 289A-289D by the urging force of the ASSY urging member 284H (FIG. 6).

At this time, the ASSY urging member 284H is stretched to a length greater than its natural length, and the plate ASSY 284 is thus urged leftward by the ASSY urging member 284H. The leftward urging force by the ASSY urging member 284H applied to the plate ASSY 284 will also be referred to as "ASSY urging force". The ASSY urging force is a force component directed leftward that is obtained by multiplying a displacement amount of the ASSY urging member 284H attributed to its stretching by a spring constant thereof.

Prior to the execution of the capping process, the CP protrusions 2814A, and 2814C are positioned adjacent to the right ends of the CP guide slots 2810A and 2810C, and are in abutment with the major surfaces of the stoppers 2820A and 2820B from rightward thereof, respectively, because of the urging force of the CP urging member 2819L. At this time, the CP urging member 2819L is stretched to a length greater than its natural length. The CP unit 287L is thus urged leftward by the CP urging member 2819L. The same applies to the CP unit 287R. The CP unit 287R is urged leftward by the corresponding CP urging member 2819R.

The leftward urging force by the CP urging member 2819L, 2819R applied to the CP unit 287L, 287R will also be referred to as "CP urging force". The CP urging force is a force component directed leftward that is obtained by multiplying a displacement amount of the CP urging member 2819L, 2819R attributed to its stretching by a spring constant thereof. The CP urging force is smaller than the ASSY urging force prior to the capping process.

Further, prior to the capping process, the recording heads 262L, 262R are positioned leftward of all the CP abutment members 2815A-2815D in the left-right direction 9. The upper end of each CP abutment member 2815A-2815D is positioned below the lower surfaces 263L, 263R of the respective recording heads 262L, 262R.

Once starting the capping process, the controller 29 controls the rotation of the carriage motor 274 to move the carriage 261 rightward toward the ASSY abutment member 285 until the nozzle cap 2812L and the vent cap 2813L are brought into intimate contact with the lower surface of the ejection module 264L and the nozzle cap 2812R and the vent cap 2813R are brought into intimate contact with the lower surface of the ejection module 264R (that is, until the state illustrated in FIGS. 13A and 13B is attained).

In the capping process, as the carriage 261 moves rightward toward the ASSY abutment member 285, the right side wall 261C (FIG. 4) of the carriage 261 is brought into abutment with the left end face 285A of the ASSY abutment member 285.

In the course of the capping process, the CP unit 287L is immovable with respect to the plate ASSY 284 until the right side wall 261C of the carriage 261 abuts on the ASSY abutment member 285. A time period from the start of the capping process to the abutment of the right side wall 261C with the ASSY abutment member 285 will also be referred to as "first time span".

In the first time span, the upper ends of the respective CP abutment member 2815A, 2815B are positioned below the lower surfaces 263L, 263R, and the CP abutment members 2815C, 2815D (see FIG. 10) are spaced apart from the left end face 285A of the ASSY abutment member 285 by a distance X46 (see FIG. 5B) in the left-right direction 9. Here, the distance X46 is shorter than the distance X42 (see FIG. 5A) between the right end of the lower surface 263R of the recording head 262R and the right side wall 261C of the carriage 261.

In the first time span, the lower surface 263R of the recording head 262R is first positioned leftward of the flat surface 2816B and the second flat surface 2816D. While moving rightward, the recording head 262R moves past the upper edge of the CP through-hole 284L without interference with the CP abutment members 2815A, 2815B, as illustrated in FIG. 5B. When the right side wall 261C abuts on the left end face 285A of the ASSY abutment member 285, the recording head 262R is at a position diagonally above and leftward of the CP through-hole 284R and leftward of and slightly apart from the CP abutment members 2815C, 2815D. The recording head 262L is distant from the recording head 262R by the leftward distance X11 and the rearward distance Y11, as described above and shown in FIG. 2A.

In FIG. 5B, the CP abutment members 2815B, 2815D are positioned rearward of the CP abutment members 2815A, 2815C and are thus hidden behind thereby. The CP protrusions 2814C, 2814G are positioned rearward of the CP protrusions 2814A, 2814E and are hidden behind thereby. The same is true with respect to FIGS. 11A through 13B.

After the right side wall 261C abuts on the left end face 285A, the ASSY abutment member 285 receives a rightward force from the carriage 261. Hence, the plate ASSY 284 starts moving rightward together with the carriage 261. As a result, the ASSY protrusions 284A-284D start separating from the left ends of the respective ASSY guide slots 289A-289D against the ASSY urging force, and are moved diagonally rightward and upward along the ASSY guide slots 289A-289D from the lower position P11 to the intermediate position P12. Here, a time period during which the ASSY protrusions 284A-284D move from the lower position P11 to the intermediate position P12 will be referred to as "second time span".

In the second time span, the CP abutment members 2815A-2815D start protruding upward from the upper ends of the respective ASSY guide members 283A-283D. Further, since the position in the left-right direction 9 of the recording head 262R relative to the ASSY abutment member 285 is maintained unchanged in the second time span, the CP abutment members 2815C, 2815D are positioned between the ASSY abutment member 285 and the recording head 262R in the left-right direction 9 without any contact with the ASSY abutment member 285 and the recording head 262R.

In the first time span, the plate ASSY 284 and the recording heads 262L, 262R are moved rightward together with the carriage 261. On the other hand, in the second time span, the recording heads 262L, 262R are separated from the CP abutment members 2815A-2815D, and the CP urging force (leftward force) of the CP urging members 2819L, 2819R is imparted on the CP units 287L, 287R. Therefore, due to the CP urging force, the CP protrusions 2814A, 2814C, 2814E, and 2814G abut on the major surfaces of the respective stoppers 2820A, 2820B, 2820C, and 2820D, from rightward thereof. That is, the CP units 287L, 287R move leftward relative to the plate ASSY 284. As such, in the second time span, the recording heads 262L, 262R move rightward and approach the CP abutment members 2815A-2815D.

After elapse of the second time span, as illustrated in FIGS. 11A and 11B, the ASSY protrusions 284A-284D move past the intermediate position P12 (FIG. 8A), and then, further move rightward toward the intermediate position P13. After the ASSY protrusions 284A-284D move past the intermediate position P12, the lower right corner portion of the front surface of the recording head 262L comes to face the sloped surface 2816A of the CP abutment member 2815A, and the lower right corner portion of the rear surface of the recording head 262L comes to face the first flat surface 2816C (facing frontward) of the CP abutment member 2815B.

In the same way, the lower right corner portion of the front surface of the recording head 262R comes to face the sloped surface of the CP abutment member 2815C, and the lower right corner portion of the rear surface of the recording head 262R comes to face the first flat surface (facing frontward) of the CP abutment member 2815D.

Subsequently, the lower right corner portion of the rear surface of the recording head 262L is brought into contact with the first flat surface 2816C of the CP abutment member 2815B. Accordingly, the position of the recording head 262L in the front-rear direction 8 relative to the CP unit 287L is fixed with accuracy. Further, as illustrated in FIGS. 12A and 12B, the front and rear lower corner portions of the right surface of the recording head 262L are brought into contact with the flat surface 2816B (facing leftward) of the CP abutment member 2815A and the second flat surface 2816D (facing leftward) of the CP abutment member 2815B, respectively. The position of the recording head 262L in the left-right direction 9 relative to the CP unit 287L is thus fixed with accuracy.

In the same way, the lower right corner portion of the rear surface of the recording head 262R is brought into abutment with the CP abutment member 2815D from its front side, and the front and rear lower corner portions of the right surface of the recording head 262R are brought into abutment with the CP abutment members 2815C, 2815D, respectively, from left side thereof. The position of the recording head 262R relative to the CP unit 287R is thus fixed in the front-rear direction 8 and the left-right direction 9 with accuracy.

In FIGS. 12A and 12B, after the recording heads 262L, 262R abut on with the CP abutment members 2815A-2815D, the recording heads 262L, 262R apply a rightward force to the respective CP units 287L, 287R. Hence, the CP protrusions 2814A, 2814C, 2814E, 2814G start separating from the major surfaces of the stoppers 2820A-2820D and move rightward within the CP guide slots 2810A, 2810C, 2810E, 2810G against the CP urging force of the CP urging members 2819L, 2819R. Likewise, the CP protrusions 2814B, 2814D, 2814F, 2814H move rightward within the respective CP guide slots 2810B, 2810D, 2810F, 2810H.

After moving past the intermediate position P13, as illustrated in FIGS. 13A and 13B, the ASSY protrusions 284A-284D move diagonally upward and rightward along the ASSY guide slots 289A-289D toward the upper position P14 from the intermediate position P13 (FIG. 8A). During the movement of the ASSY protrusions 284A-284D toward the upper position P14, the CP units 287L, 287R move diagonally upward and rightward along with the plate ASSY 284, whereas the position of the recording heads 262L, 262R in the up-down direction 7 is kept unchanged. Accordingly, the CP units 287L, 287R approach the respective lower surfaces 2631, 263R of the recording heads 262L, 262R.

Upon arrival of the ASSY protrusions 284A-284D at the upper position P14, the lips 2812B, 2813B (the nozzle cap 2812L and vent cap 2813L) of the cap unit 287L come into intimate contact with the lower surface of the ejection module 264L of the recording head 262L. Likewise, the nozzle cap 2812R and the vent cap 2813R of the CP unit 287R come into intimate contact with the lower surface of the ejection module 264R of the recording head 262R.

The controller 29 then halts the rotation of the carriage motor 274 to stop the rightward movement of the carriage 261, and starts actuating the pump 291 for purging.

<Uncapping Process>

The controller 29 is configured to start executing an uncapping process in a case where a prescribed condition(s) for execution of the uncapping process is satisfied, such as, for example, when an image forming process is to be started.

Upon start of the uncapping process, the ASSY protrusions 284A-284D are each at the upper position P14 (FIG. 8A), as illustrated in FIGS. 13A and 13B. The nozzle cap 2812L and the vent cap 2813L (lips 2812B, 2813B) are in intimate contact with the lower surface of the ejection module 264L of the recording head 262L. Further, the nozzle cap 2812R and the vent cap 2813R of the CP unit 287R are in intimate contact with the lower surface of the ejection module 264R of the recording head 262R. The recording head 262L is in abutment with the CP abutment members 2815A, 2815B, and the recording head 262R is in abutment with the CP abutment members 2815C, 2815D. The right side wall 261C of the carriage 261 is in abutment with the ASSY abutment member 285.

During the uncapping process, the controller 29 controls the rotation of the carriage motor 274 to convey the carriage 261 leftward. Following the leftward movement of the carriage 261, the plate ASSY 284 moves leftward by the urging force of the ASSY urging member 284H (see FIG. 6).

Referring to FIGS. 13A and 13B, the ASSY protrusions 284A-284D move diagonally leftward and downward along the ASSY guide slots 289A-289B from the upper position P4 toward the intermediate position P13 (see FIG. 8A). As the ASSY protrusions 284A-284D move toward the intermediate position P13, the CP units 287L, 287R move diagonally leftward and downward together with the movement of the plate ASSY 284. On the other hand, the position of the recording heads 262L, 262R in the up-down direction 7 is maintained unchanged. Hence, the lips 2812B, 2813B of the CP unit 287L start separating from the lower surface of the ejection module 264L, and the nozzle cap 2812R and the vent cap 2813R of the CP unit 287R start separating from the lower surface of the ejection module 264R. The CP abutment members 2815A-2815D of the CP units 287L, 287R move downward.

As the ASSY protrusions 284A-284D move toward the intermediate position P12 after moving past the intermediate position P13, as illustrated in FIGS. 11A through 12B, the recording heads 262L, 262R are separated leftward from the respective CP abutment members 2815A-2815D. As a result, the CP protrusions 2814A, 2814C, 2814E, 2814G move leftward within the CP guide slots 2810A, 2810C, 2810E, 2810G, and are brought into abutment with the major surfaces of the stoppers 2820A-2820D by the urging force of the CP urging members 2819L, 2819R.

Subsequently, the ASSY protrusions 284A-284D move diagonally leftward and downward along the ASSY guide slots 289A-289D while moving toward the lower position P11 past the intermediate position P12.

Here, the distance in the left-right direction 9 between the right lower end of the recording head 262L and the left lower end of the recording head 262R is slightly greater than the distance in the left-right direction 9 between the intermediate position P12 and the lower position P11. Hence, the CP abutment members 2815A, 2815B move downward to a position lower than the upper ends of the ASSY guide members 283A, 283B by the time when the left end of the recording head 262R reaches the right ends of the CP abutment members 2815A, 2815B. As a result, the recording head 262R can move leftward to a position above the platen 25 without contacting with the CP abutment members 2815A, 2815B.

As illustrated in FIGS. 5A and 5B, upon arrival at the lower position P11, the ASSY protrusions 284A-284D abut on the left ends of the corresponding ASSY guide slots 289A-289D. Hence, the plate ASSY 284 cannot move further leftward following the leftward movement of the carriage 261, so that the carriage 261 moves leftward away from the ASSY abutment member 285.

Operational and Technical Advantages of the Embodiment

According to the described embodiment, the carriage 261 moves rightward together with the plate ASSY 284 once the carriage 261 abuts on the ASSY abutment member 285 during the rightward movement of the carriage 261. While moving rightward, the plate ASSY 284 moves toward the recording heads 262L, 262R (i.e., upward) to approach the same through the guide by the ASSY guide members 283A-283D. Accordingly, the CP abutment members 2815A-2815D are caused to move upward to the position where the CP abutment members 2815A-2815D can abut on the recording heads 262L, 262R.

While moving rightward together with the plate ASSY 284, the recording heads 262L, 262R come into contact with the CP abutment members 2815A-2815D, thereby providing positional fixing of the recording heads 262L, 262R relative to the CP units 287L, 287R.

As the recording heads 262L, 262R further move rightward together with the plate ASSY 284, the nozzle cap 2812L of the CP unit 287L covers the plurality of nozzles 269L and the nozzle cap 2812R of the CP unit 287R covers the plurality of nozzles 269R.

While the plate ASSY 284 moves rightward by the abutment of the rightwardly moving carriage 261 on the ASSY abutment member 285, the CP units 287L, 287R are urged leftward by the CP urging members 2819L, 2819R so as to be kept in abutment with the stoppers 2820A-2820D. That is, the CP abutment members 2815A-2815D move leftward relative to the recording heads 262L, 262R that are moving rightward together with the plate ASSY 284, so that the CP abutment members 2815A-2815D abut on the recording heads 262L, 262R. With this configuration, precise positioning of the CP units 287L, 287R relative to the recording heads 262L, 262R can be attained.

The plate ASSY 284 moves rightward against the urging force of the ASSY urging member 284H in accordance with the rightward movement of the carriage 261 due to the abutment of the carriage 261 with the ASSY abutment member 285 provided on the plate ASSY 284. While the plate ASSY 284 moves rightward, the cap units 287L, 287R are caused to move upward to approach the recording heads 262L, 262R through the upward movement of plate ASSY 284 by the guide of the ASSY guide members 283A-283D. In accordance with the upward movement of the cap units 287L, 287R, the recording heads 262L, 262R abut on the CP abutment members 2815A-2815D of the cap units 287L, 287R.

In this way, precise positioning of the CP unit 287L relative to the recording head 262L can be attained, and, hence, the valves 267A-267D of the recording head 262L can be securely opened and closed by the vent protrusions 2813C-2813F of the cap unit 287L. The same is true with respect to the relationship between the CP unit 287R and the recording head 262R.

Further, according to the present embodiment, the CP units 287L, 287R are movable to the lower position P11, the intermediate positions P12, P13, and the upper positions P14, P15, since the ASSY guide members 283A-283D can guide the plate ASSY 284 upward to approach the recording heads 262L, 262R.

Specifically, at the lower position P11, the nozzle caps 2812L, 2812R do not cover the nozzles 269L, 269R; and the CP abutment members 2815A-2815D do not contact the recording heads 262L, 262R. At the intermediate positions P12, P13, the CP abutment members 2815A-2815D are in abutment with the recording heads 262L, 262R; and the nozzle caps 2812L, 2812R do not cover the nozzles 269L, 269R. At the upper positions P14, P15, the CP abutment members 2815A-2815D are in abutment with the recording heads 262L, 262R; and the nozzle caps 2812L, 2812R cover the nozzles 269L, 269R. As such, the nozzle caps 2812L, 2812R can securely cover the nozzles 269L, 269R.

In this way, the CP units 287L, 287R are movable to the lower position P11, the intermediate positions P12, P13, and the upper positions P14, P15 in the present embodiment. With this configuration, mechanical interference is unlikely to occur between the recording head 262R and the CP abutment member 2815A (or the CP abutment member 2815B or both) during the capping process, even though movable ranges of the recording heads 262L, 262R are designed to overlap with respective movable ranges of the CP units 287L, 287R in the up-down direction 7 and the front-rear direction 8 in the printer 100. Hence, the nozzle caps 2812L, 2812R can securely cover the nozzles 269L, 269R. Further, in the uncapping process as well, the nozzle caps 2812L, 2812R can be securely separated from the nozzles 269L, 269R without mechanical interference between the recording head 262R and at least one of the CP abutment members 2815A, 2815B.

According to the embodiment, each of the ASSY guide slots 289A-289D includes the second horizontal portion extending in the left-right direction 9 and configured to guide the plate ASSY 284 from the intermediate position P12 to the intermediate position P13 in the left-right direction 9 while maintaining the CP units 287L, 287R at the positions P12, P13 of the same vertical height as each other in the up-down direction 7. With this configuration, the CP abutment members 2815A-2815D can approach the recording heads 262L, 262R while the position of the CP units 287L, 287R is maintained at the intermediate position P12, P13 in the up-down direction 7. This configuration can suppress the nozzle caps 2812L, 2812R from abutting on the first regions 268L, 268R (nozzles 269L, 269R) before the CP abutment members 2815A-2815D abuts on the recording heads 262L, 262R.

According to the embodiment, the CP abutment members 2815A-2815D can provide positioning of the recording heads 262L, 262R in the two directions, i.e., in the front-rear direction 8 and the left-right direction 9.

<Variations and Modifications>

According to the embodiment, the printer 100 includes two recording heads 262L, 262R and two CP units 287L, 287R. However, the printer 100 may include a single recording head 262L and a single CP unit 287L. Instead of the recording head 262R, the printer 100 may include a protruding member protruding downward from the base wall 261A of the carriage 261. In this case as well, the nozzle cap 2812L can securely cover the nozzles 269L in the capping process without interference of the protruding member and the base wall 261A with at least one of the CP abutment members 2815A, 2815B. Further, the nozzle cap 2812L can be reliably separated from the nozzles 269L in the uncapping process without interference of the protruding member and the base wall 261A with at least one of the CP abutment members 2815A, 2815B.

According to the embodiment, the ASSY guide members 283A-283D are configured to guide the movement of the plate ASSY 284 in the up-down direction 7 and the left-right direction 9. That is, a single guide portion (more specifically, the ASSY guide slots 289A-289D of the respective ASSY guide members 283A-283D) functions as a guide portion configured to guide the plate ASSY 284 (ASSY protrusions 284A-284D) in the left-right direction 9, as well as a guide portion configured to guide the plate ASSY 284 (ASSY protrusions 284A-284D) in the up-down direction 7. However, the ASSY guide members 283A-283D may be configured to guide the movement of the plate ASSY 284 in the left-right direction 9 only. In the latter case, a guide member or a slide cam may be provided at the plate ASSY 284 or the CP units 287L, 287R for guiding the movement of the plate ASSY 284 in the up-down direction 7 and the left-right direction 9.

According to the embodiment, the ASSY protrusions 284A, 284C are provided at the front panel 284F of the plate ASSY 284, and the ASSY protrusions 284B, 284D are provided at the rear panel 284G of the plate ASSY 284; and the ASSY guide members 283A, 283C are provided at the front wall 282A, and the ASSY guide members 283B, 283D are provided at the rear wall 282B. However, the ASSY protrusions 284A, 284C may be provided at the front wall 282A, and the ASSY protrusions 284B, 284D may be provided at the rear wall 282B; and the ASSY guide members 283A, 283C may be provided at the front panel 284F of the plate ASSY 284, and the ASSY guide members 283B, 283D may be provided at the rear panel 284G of the plate ASSY 284.

While the description has been made in detail with reference to the embodiments, it would be apparent to those skilled in the art that many modifications and variations may be made thereto.

<Remarks>

The printer 100 is an example of an image recording apparatus. The carriage 261 is an example of a carriage. The recording head 262L, 262R is an example of a head. The lower surface of the ejection module 264L, 264R is an example of a nozzle surface. The nozzles 269L, 269R are an example of nozzles. The cap unit 287L, 287R is an example of a cap unit. The nozzle cap 2812L, 2812R is an example of a cap. The ASSY abutment member 285 is an example of a first abutment portion. The CP abutment members 2815A-2815D are examples of a second abutment portion. The ASSY guide slots 289A-289D are examples of a first guide portion and examples of a second guide portion. The ASSY urging member 284H is an example of a first urging member. The CP urging member 2819L, 2819R is an example of a second urging member. The stoppers 2820A-2820D are examples of a stopper. The ASSY protrusions 284A-284D are examples of a protruding portion. The CP protrusions 2814A-2814H are examples of a convex portion. The CP guide slots 2810A-2810H are examples of a slot portion. The rightward direction is an example of a first direction. The leftward direction is an example of a direction opposite the first direction. The up-down direction 7 is an example of a second direction. The front-rear direction 8 is an example of a third direction. The position P11 is an example of a first position. The position P12, P13 is an example of a second position. The position P14, P15 is an example of a third position. The ASSY guide members 283A-283D are examples of a guide member.

What is claimed is:

1. An image recording apparatus comprising:

a carriage movable in a first direction;

a head mounted on the carriage and having a nozzle surface formed with nozzles to eject liquid through the nozzles;

a plate assembly movable in the first direction and including a first abutment portion, the carriage being movable in the first direction toward the first abutment portion to abut in the first direction on the first abutment portion;

a cap unit mounted on the plate assembly and movable relative to the plate assembly in the first direction, the cap unit including a cap configured to cover the nozzle surface, the cap unit being also movable toward and away from the head in a second direction crossing the first direction to cover and uncover the nozzle surface, the cap unit including a second abutment portion, the head being configured to abut, in the first direction, on the second abutment portion in accordance with movement of the carriage in the first direction toward the first abutment portion;

a first guide portion configured to guide the plate assembly the first direction toward the first abutment portion; and a second guide portion configured to guide the plate assembly or the cap unit in the second direction to move the cap unit toward the head in accordance with movement of the plate assembly in the first direction.

2. The image recording apparatus according to claim 1, further comprising:

a first urging member urging the plate assembly direction opposite the first direction away from the first abutment portion;

a second urging member urging the cap unit in the direction opposite the first direction relative to the plate assembly; and a stopper configured to abut on the cap unit to restrict the cap unit from moving further in the direction opposite the first direction relative to the plate assembly against an urging force of the second urging member while the plate assembly moves in the first direction following movement of the carriage in the first direction in a state where the carriage is in abutment with the first abutment portion.

3. The image recording apparatus according to claim 1, wherein the cap unit is movable to a first position, to a second position and to a third position while the second guide portion guides the plate assembly or the cap unit toward the head in the second direction, wherein the head is separated from the second abutment portion and the cap uncovers the nozzle surface of the head while the cap unit is at the first position, wherein the head is in abutment with the second abutment portion and the cap uncovers the nozzle surface of the head while the cap unit is at the second position, and wherein the head is in abutment with the second abutment portion and the cap covers the nozzle surface of the head while the cap unit is at the third position.

4. The image recording apparatus according to claim 3, wherein the second position is closer to the first abutment portion than the first position is to the first abutment portion in the first direction, and wherein the third position is closer to the first abutment portion than the second position is to the first abutment portion in the first direction.

5. The image recording apparatus according to claim 3, further comprising a protruding portion protruding from one of the plate assembly and the cap unit, wherein the second guide portion is a guide slot in which the protruding portion is inserted, the guide slot extending to approach the head in the second direction as extending in the first direction toward the first abutment portion.

6. The image recording apparatus according to claim 5, wherein the guide slot has a linear part extending linearly in the first direction, the linear part being configured to guide the plate assembly or the cap unit in the first direction while maintaining the cap unit at the second position.

7. The image recording apparatus according to claim 1, further comprising a protruding portion protruding from the plate assembly, wherein the first guide portion is a guide slot in which the protruding portion is inserted, the guide slot extending in the first direction.

8. The image recording apparatus according to claim 1, further comprising:

a convex portion protruding from one of the cap unit and the plate assembly; and a slot portion extending in the first direction and formed in a remaining one of the cap unit and the plate assembly, the convex portion being received in the slot portion to allow the cap unit to be movable in the first direction relative to the plate assembly.

9. The image recording apparatus according to claim 1, wherein the cap unit includes two of the second abutment portions positioned to be spaced apart from each other in a third direction crossing the first direction and the second direction, and wherein the head has a surface facing in the first direction and configured to abut on at least one of the two second abutment portions while moving in the first direction.

10. The image recording apparatus according to claim 1, wherein the head comprises a first head and a second head spaced apart from each other in the first direction, the first head having a first nozzle surface and the second head having a second nozzle surface, wherein the cap unit comprises: a first cap unit configured to cover the first nozzle surface and movable in the first direction relative to the plate assembly; and a second cap unit configured to cover the second nozzle surface and movable in the first direction relative to the plate assembly, and wherein the cap unit includes two of the second abutment portions, one of the second abutment portions being provided at the first cap unit and a remaining one of the second abutment portions being provided at the second cap unit.

11. The image recording apparatus according to claim 10, wherein the first head occupies a region partially overlapped with a region that the second head occupies in a third direction crossing the first direction and the second direction, wherein the first head is positioned closer to the first abutment portion than the second head is to the first abutment portion in the first direction, and wherein the second guide portion is configured to guide the plate assembly or the second cap unit to move the second cap unit toward the second head in the second direction when the second abutment portion of the second cap unit is positioned between the first head and the second head in the first direction.

12. The image recording apparatus according to claim 1, wherein the first guide portion and the second guide portion constitute a single member.

13. An image recording apparatus comprising:

a carriage movable in a first direction;

a head mounted on the carriage and having a nozzle surface formed with nozzles to eject liquid through the nozzles;

a plate assembly movable in the first direction and including a first abutment portion, the carriage being movable in the first direction toward the first abutment portion to abut, in the first direction, on the first abutment portion;

a cap unit mounted on the plate assembly and movable relative to the plate assembly in the first direction, the cap unit including a cap configured to cover the nozzle surface, the cap unit being also movable toward and away from the head in a second direction crossing the first direction to cover and uncover the nozzle surface, the cap unit including a second abutment portion the head being configured to abut, in the first direction, on the second abutment portion in accordance with movement of the carriage in the first direction toward the first abutment portion; and a guide member comprising:

- a first guide portion configured to guide the plate assembly in the first direction toward the first abutment portion; and
- a second guide portion configured to guide the plate assembly in the second direction to move the cap unit toward the head in the second direction in accordance with movement of the plate assembly in the first direction.

14. The image recording apparatus according to claim 13, further comprising:

a first urging member urging the plate assembly in a direction opposite the first direction away from the first abutment portion;

a second urging member urging the cap unit in the direction opposite the first direction relative to the plate assembly; and a stopper configured to abut on the cap unit to restrict the cap unit from moving further in the direction opposite the first direction relative to the plate assembly against an urging force of the second urging member while the plate assembly moves in the first direction following movement of the carriage in the first direction in a state where the carriage is in abutment with the first abutment portion.

15. The image recording apparatus according to claim 13, further comprising a protruding portion protruding from the plate assembly in a third direction crossing the first direction and the second direction, wherein the guide member is formed with a guide slot penetrating through a thickness of the guide member in the third direction, the protruding portion being inserted in the guide slot to be engaged therewith, the guide slot having:

a first part extending in the first direction and functioning as the first guide portion; and a second part sloping relative to the first direction to approach the head as extending in the first direction toward the first abutment portion, the second part serving as the second guide portion.

* * * * *